United States Patent
Yagi et al.

(10) Patent No.: US 8,879,123 B2
(45) Date of Patent: Nov. 4, 2014

(54) IMAGE PROCESSING APPARATUS, COLOR CONVERSION METHOD AND COMPUTER READABLE MEDIUM

(71) Applicant: PFU Limited, Kahoku (JP)

(72) Inventors: Junji Yagi, Kahoku (JP); Akira Iwayama, Kahoku (JP)

(73) Assignee: PFU Limited, Kahoku-shi (JP)

( * ) Notice: Subject to any disclaimer, the term of this patent is extended or adjusted under 35 U.S.C. 154(b) by 104 days.

(21) Appl. No.: 13/759,934

(22) Filed: Feb. 5, 2013

(65) Prior Publication Data

US 2013/0265614 A1    Oct. 10, 2013

(30) Foreign Application Priority Data

Apr. 6, 2012   (JP) .................. 2012-087444

(51) Int. Cl.
*H04N 1/40*    (2006.01)
*H04N 1/60*    (2006.01)

(52) U.S. Cl.
CPC .................. *H04N 1/6019* (2013.01)
USPC .......... 358/3.23; 358/1.9; 358/525; 358/518; 358/521; 358/520

(58) Field of Classification Search
None
See application file for complete search history.

(56) References Cited

U.S. PATENT DOCUMENTS

2005/0052671 A1*  3/2005  Nishikawa .............. 358/1.9
2009/0225379 A1*  9/2009  Maki ..................... 358/520

FOREIGN PATENT DOCUMENTS

JP      11-275375      10/1999
JP      2000-244755    9/2000

* cited by examiner

*Primary Examiner* — Quang N Vo
(74) *Attorney, Agent, or Firm* — Christie, Parker & Hale, LLP

(57) ABSTRACT

An image processing apparatus that performs a color conversion of a image expressed by coordinates of a multidimensional color space, including, a storage unit for storing lattice point data in the multidimensional color space, an address generating unit for generating addresses for reading from the storage unit the lattice point data in a first region and a second region in accordance with input values of a color signal, the first region being a region where values of all color components are equal to or larger than a first threshold, the second region being different from the first region, and an interpolating unit for generating a converted color signal by an interpolating process based on the read lattice point data. A lattice-point interval in the first region is narrower than a lattice-point interval in the second region.

10 Claims, 18 Drawing Sheets

FIG.4
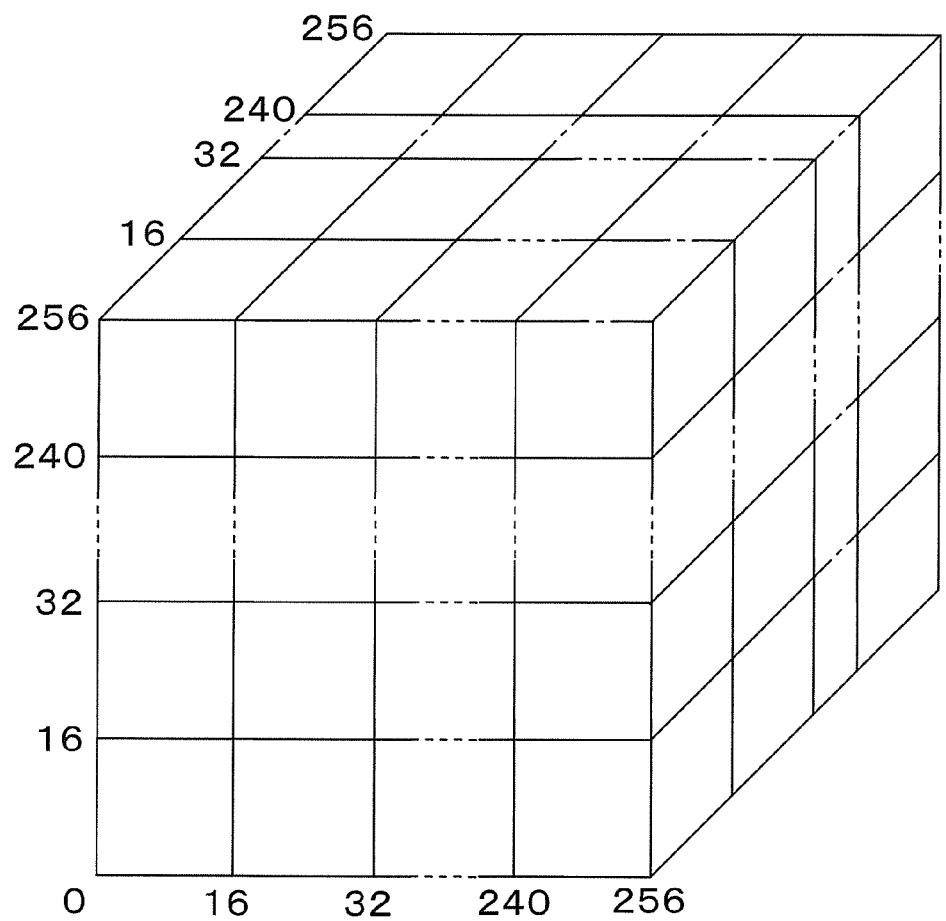
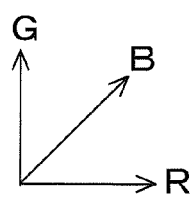

IMAGE PROCESSING APPARATUS, COLOR CONVERSION METHOD AND COMPUTER READABLE MEDIUM

CROSS-REFERENCE TO RELATED APPLICATIONS

This application is based upon and claims the benefit of priority of prior Japanese Patent Application No. 2012-087444, filed on Apr. 6, 2012, the entire contents of which are incorporated herein by reference.

TECHNICAL FIELD

Embodiments illustrated herein relate to color conversion of a multicolor image expressed by coordinates in a multidimensional color space.

BACKGROUND

As a technique for color conversion of multicolor images, a color converting apparatus that converts an input color signal into a color value within a predetermined range is known. The color converting apparatus includes a multidimensional lookup table and interpolation calculating means. The multidimensional lookup table holds converted color values corresponding to color values of lattice points of a lattice that divides a color space formed by color signal values to be input. The interpolation calculating means obtains, by interpolation, the converted color value of the input color signal on the basis of the converted color values of the lattice points output from the multidimensional lookup table in accordance with the input color signal.

As another technique for color conversion, a color printer including a color correction processing unit is known. The color correction processing unit includes a boundary determining function unit that determines positional relation of an input point relative to a boundary region, the input point being an input color image signal supplied to an input buffer. On the basis of the determination, the color correction processing unit causes a three-dimensional weighting coefficient storage unit to supply converted values of lattice points and weighting coefficients to a color correction processing function unit, the values of the lattice points and the weighting coefficients being used in calculating converted values at two intersecting points. On the basis of the read values, the color correction processing unit causes either an input range processing unit or a boundary region processing unit to perform an interpolating process to generate an appropriate output converted color image.

Related art is disclosed in Japanese Laid-open Patent Publications No. 11-275375 and 2000-244755.

SUMMARY

When the converted color signals at the lattice points of the lattice that divides the multidimensional color space are stored in the lookup table, and a converting process for interpolating a color signal between the lattice points is performed, a memory amount used in the lookup table can be reduced by widening an interval between the lattice points. However, widening the interval between the lattice points may cause interpolating accuracy to be degraded.

For example, in a highlight region where all color components are relatively high, preferably, gradation of a pale color is maintained while a ground color that is supposed to be white is made white. For example, when an image is obtained by using a color scanner with a monochrome sensor to read a document on which a color is attached by a fluorescent highlighter, light other than reading target color components is also detected by an excitation effect of fluorescent ink, so that a color signal of a colored portion indicates more whitish than the original color. When a lattice-point interval is widened, a set interval of thresholds for correcting a color signal in the highlight region to be complete white is made rough. Accordingly, unfortunately, a color signal of such a pale color may also be corrected to be white.

The purpose of the apparatus, method, and computer program described herein is to improve interpolating accuracy in a highlight region while reducing a memory usage amount, in color conversion using a lookup table and an interpolating process.

In accordance with an aspect of the embodiment, an image processing apparatus performing a color conversion of a multicolor image expressed by coordinates of a multidimensional color space, including a storage unit for storing lattice point data for each lattice point in the multidimensional color space, an address generating unit for generating addresses for reading from the storage unit the lattice point data in a first region and a second region in the multidimensional color space in accordance with input values of a color signal, the first region being a region where values of all color components are equal to or larger than a first threshold, the second region being different from the first region, and an interpolating unit for generating a converted color signal by an interpolating process based on the read lattice point data is provided. A lattice-point interval in the first region is narrower than a lattice-point interval in the second region.

In accordance with another aspect of the embodiment, a color conversion method for a multicolor image expressed by coordinates a multidimensional color space, including generating addresses for reading lattice point data in a first region and a second region in the multidimensional color space in accordance with input values of a color signal, from a storage unit storing the lattice point data for each lattice point in the multidimensional color space, the first region being a region where values of all color components are equal to or larger than a first threshold, the second region being different from the first region, and generating a converted color signal by an interpolating process based on the read lattice point data is provided. A lattice-point interval in the first region is narrower than a lattice-point interval in the second region.

In accordance with another aspect of the embodiment, a computer-readable, non-transitory medium storing a computer program for image processing, wherein the computer program causes a processor to execute a process, the process including generating addresses for reading lattice point data in a first region and a second region in the multidimensional color space in accordance with input values of a color signal, from a storage unit storing the lattice point data for each lattice point in the multidimensional color space, the first region being a region where values of all color components are equal to or larger than a first threshold, the second region being different from the first region, and generating a converted color signal by an interpolating process based on the read lattice point data is provided. A lattice-point interval in the first region is narrower than a lattice-point interval in the second region.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4 depicts one example of coordinates of the lattice points in FIG. 3.

DESCRIPTION OF EMBODIMENTS

1. Hardware Configuration

In the following, preferred embodied examples will be illustrated with reference to the accompanying drawings. In the following, an image processing apparatus illustrated herein will be illustrated by using an example of an image reading system that reads a two-dimensional document to generate an image signal. However, the example does not intend that the image processing apparatus illustrated herein specification is limited to the application to the image reading system. The image processing apparatus illustrated herein can be widely applied to apparatus that perform color conversion of multicolor image represented by coordinates in a multidimensional color space. For example, the image processing apparatus may be applied to a data processing apparatus that causes a scanner to read a two-dimensional document, and/or that causes a printer to print image data. In the following illustration, the multidimensional color space is written also as "color space."

Figure 1:
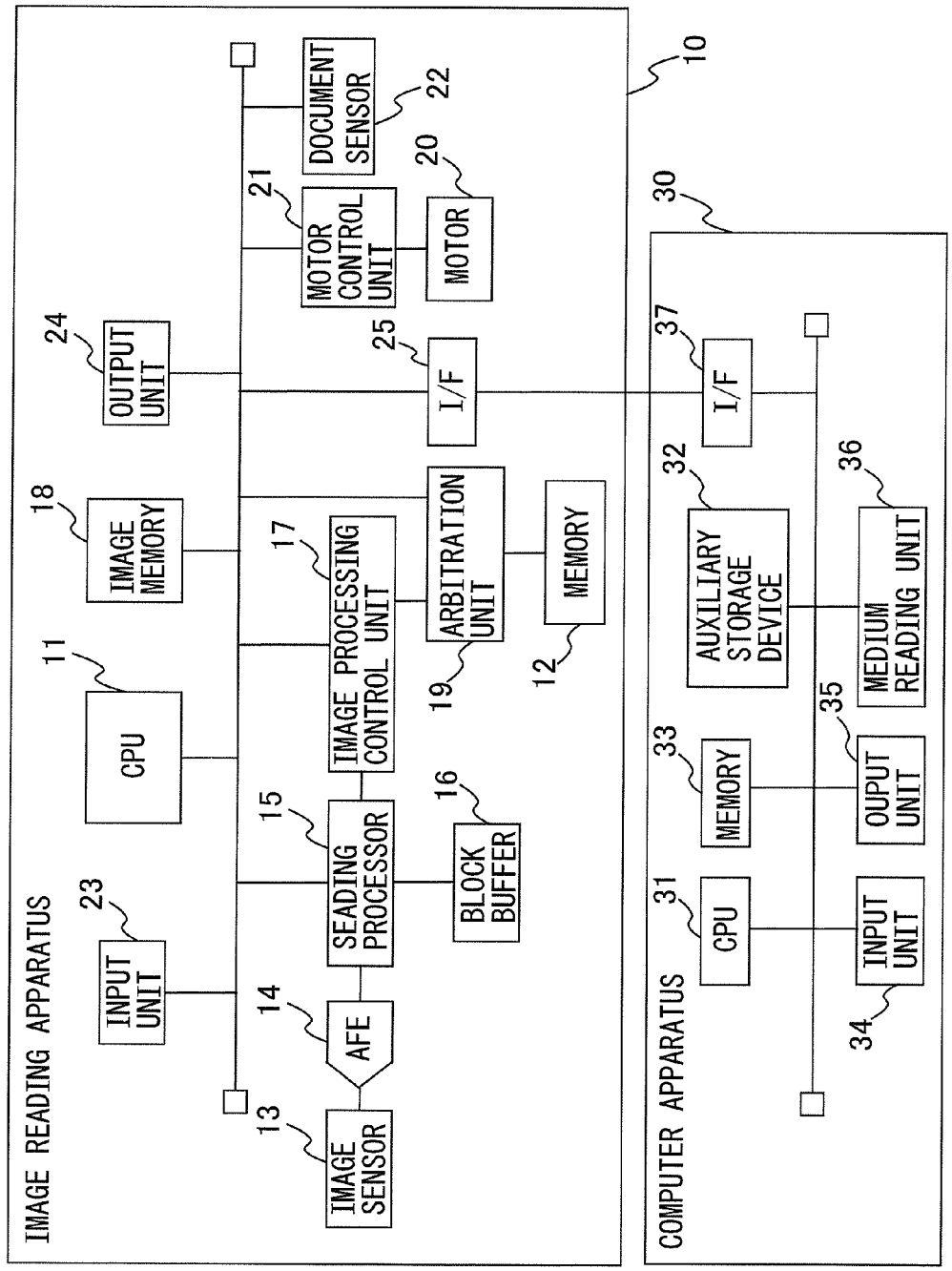
FIG. 1 depicts a hardware configuration of an image processing system.

FIG. 1 is a view depicting the hardware construction of an image processing system. The image processing system 1 includes an image reading apparatus 10 and a computer apparatus 30. The image reading apparatus 10 reads-out a two-dimensional document and generates an image signal corresponding to the document. The image reading apparatus 10 may be, for example, an image reading apparatus that reads by scanning a two-dimensional document exposed to light from plural light sources. Examples of such image reading apparatus include, for example, various scanning apparatuses such as a feeder scanner, a flatbed scanner, a handy scanner, etc. An exemplary embodiment will be described below with a feeder scanner as an example.

The computer apparatus 30 is capable of communicating with the image reading apparatus 10 via a wired or wireless communication line, and receives an image signal of the document read-out by the image reading apparatus 10 from the image reading apparatus 10 via this communication line.

The image reading apparatus 10 includes a CPU (Central Processing Unit) 11, a memory 12, an image sensor 13, an AFE (Analog Front-End Processor) 14, a shading processor 15, and a block buffer 16. The image reading apparatus 10 also includes an image processing control unit 17, an image memory 18, an arbitration unit 19, a motor 20, a motor control unit 21, a document sensor 22, an input unit 23, an output unit 24, and an interface (I/F).

CPU 11 controls the operation of the image reading apparatus 10 in accordance with the computer program stored in the memory 12. In an exemplary embodiment, CPU 11 may perform image processing of document image read by the image reading apparatus 10. The memory 12 may store computer programs for such image processing. The memory 12 may store computer programs executed by CPU 11 and data used in the execution of the computer program. The memory 12 may include a non-volatile storage device for storing the program or a volatile memory for temporarily storing data.

The image sensor 13 takes an image of a 2-dimensional document and outputs the image signal corresponding to the document. The image sensor 13 includes an imaging device such as one-dimensional or two-dimensional array of a CCD (Charge Coupled Device) sensor or a CMOS (Complementary Metal Oxide Semiconductor) sensor and an optical system forming an image of the document on the imaging device. AFE 14 performs amplification or other signal processing on the image signal outputted from the image sensor 13, and outputs the processed image signal to the shading processor 15.

The shading processor 15 contains the image signal received from AFE 14 in the block buffer 16 as image data, and after performing shading correction on the image data, outputs the data to the image processing control unit 17. The image processing control unit 17 performs prescribed image processing on the image data after being subjected to shading processing, and stores the image data in the image memory 18. In other exemplary embodiment, the shading processor 15 may store the image data after shading processing in the image memory 18, and the image processing control unit 17 may input the image data from the image memory 18. The arbitration unit 19 arbitrates access to the memory 12 by the image processing control unit 17 for image processing and access to the memory 12 by CPU 11 so as not to compete with each other.

The motor 20 imparts rotational drive to the roller that conveys a document from a document tray of the document reader apparatus 10 to a position for the document to be read by the image sensor 13. The motor control unit 21 controls the operation of the motor 20 for conveying the document at the time of reading the document. The document sensor 22 detects whether or not the document is situated at the specified position on the conveyance path for conveying the document to the document reading position.

In an exemplary embodiment, the shading processor 15, the image processing unit 17, the arbitration unit 19 and the motor control unit 21 may be implemented as a logic circuit mounted in the image reading apparatus 10. The logic circuit may be, for example, a LSI (large scale integration), AISC (Application Specific Integrated Circuit), FPGA (Field-Programming Gate Array), etc. In another exemplary embodiment, the shading processor 15, the image processing unit 17, the arbitration unit 19 and the motor control unit 21 may be implemented as an electronic circuit mounted in the image reading apparatus 10, including a processor such as CPU or DSP (digital signal processor) and a memory storing programs.

The input unit 23 is an input device that receives input operation by a user. The input unit 23 may be, for example, a button, a scroll wheel, a key pad, a keyboard, a pointing device, or a touch panel, etc. The output unit 24 is an output device that presents information from the image reading apparatus 10 to a user. For example, the output unit 24 may be a display device that visually displays information to be presented to a user. The output unit 24 may be a display device such as a light emitting device, a liquid crystal display, an organic electro-luminescence display, etc. Alternatively, the output unit 24 may be a speaker outputting audio signal and its driving circuit.

I/F 25 is a wired and/or wireless communication interface between the image reading apparatus 10 and the computer apparatus 30. The image reading apparatus 10 can transmit the image data of the document read via I/F 25 to the computer apparatus 30. The image reading apparatus 10 receives setting information and instruction on the operation of the image reading apparatus 10 via I/F 25 from the computer apparatus 30. In an exemplary embodiment, the image reading apparatus 10 may receive via I/F 25 the image data having been processed by the computer apparatus 30.

The computer apparatus 30 includes CPU 31, an auxiliary storage device 32, a memory 33, an input unit 34, an output unit 35, a medium reading unit 36 and I/F 37. CPU 31 executes the computer program stored in the auxiliary storage device 32 to thereby execute the information processing in accordance with the computer program. In an exemplary embodiment, CPU 31 may execute image processing of the document image read by the image reading apparatus 10. The auxiliary storage device 32 may store a computer program for such an image processing. The auxiliary storage device 32 may includes a non-volatile storage device, or ROM (Read Only Memory), or a hard disk for storing the computer program.

The memory 33 stores the program being executed by CPU 31 or data temporarily used in this program. The memory 33 may include RAM (Random Access Memory). The input unit 34 is an input device for receiving input operation by a user. The input unit 34 may be, for example, a key pad, a keyboard, a pointing device, a touch panel, etc.

The output unit 35 is an output device for outputting the signal processed by the computer apparatus 30. For example, the output unit 35 may be a display device for visually displaying to a user the information processed by the computer apparatus 30. The output unit 35 may be a display device such as, for example, a liquid crystal display, a CRT (Cathode Ray Tube) display, an organic electroluminescence display, etc. Alternatively, the output unit 35 may be a speaker and its driving circuit for outputting audio signal.

The medium reading unit 36 is an input device for reading the data stored in a computer readable and portable recording medium. For example, the medium reading unit 36 may be a CD-ROM drive apparatus, a DVD-ROM drive apparatus, a flexible disc drive apparatus, a CD-R drive apparatus, a DVD-R drive apparatus, a MO drive apparatus or an access apparatus to a flash memory apparatus.

I/F 37 is a wired/wireless communication interface between the image reading apparatus 10 and the computer apparatus 30. The computer apparatus 30 can receive via I/F 37 the image data of a document read by the image reading apparatus 10. The computer apparatus 30 transmits setting information and instruction about the operation of the image reading apparatus 10 via I/F 37 to the image reading apparatus 10.

The hardware configuration depicted in FIG. 1 is merely an example for describing the embodied examples. The image processing apparatus illustrated in the present specification may be provided with any configuration that performs the operation illustrated below.

2. First Embodied Example 2.1 Functional Configuration

Figure 2:
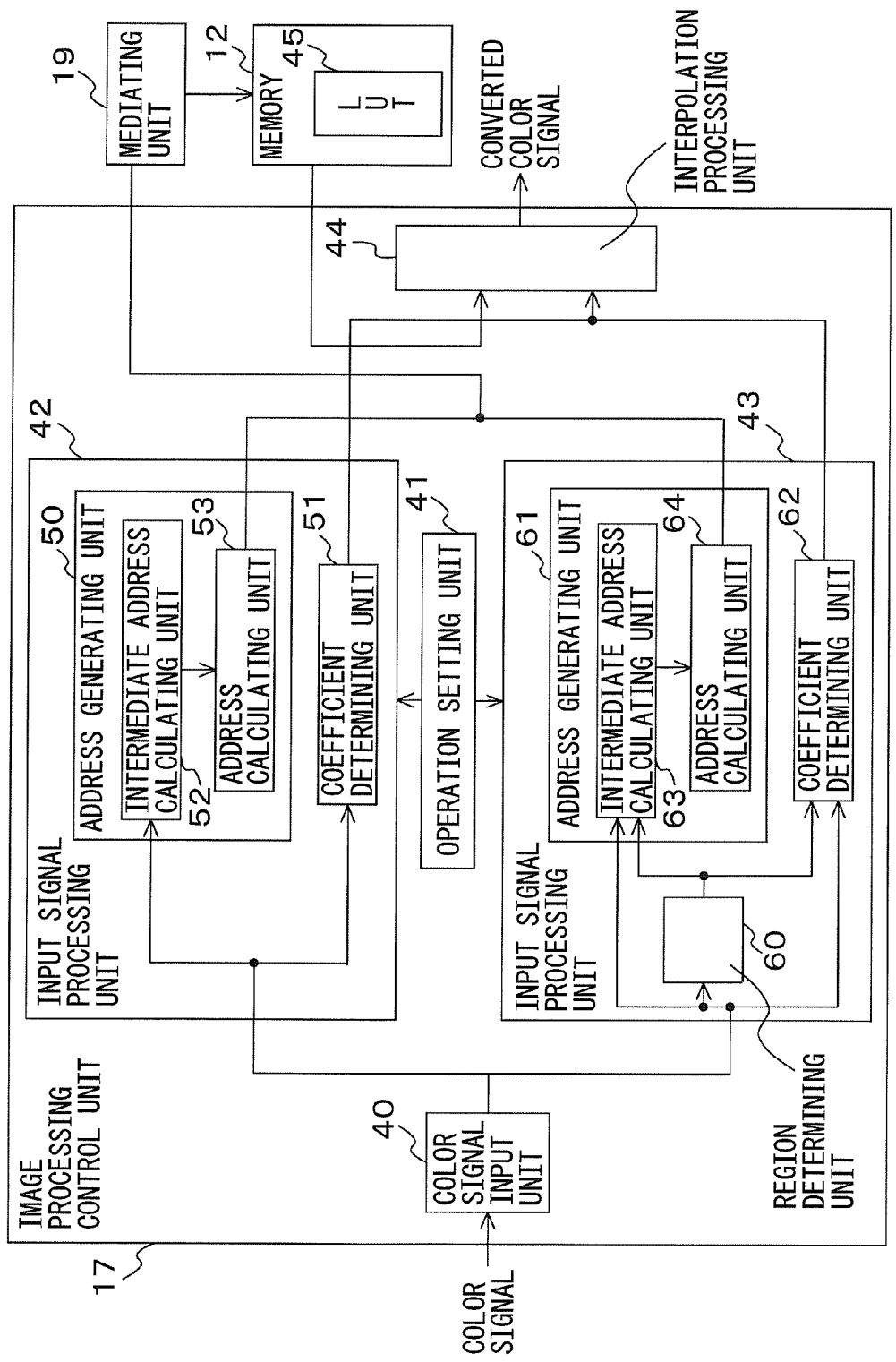
FIG. 2 depicts an example of a functional configuration of an image processing control unit.

FIG. 2 depicts an example of a functional configuration of the image processing control unit 17. The image processing control unit 17 includes a color signal input unit 40, an operation setting unit 41, an input signal processing units 42 and 43, and an interpolation processing unit 44. In the memory 12, the lookup table 45 is stored, the lookup table 45 storing lattice point data that is the converted color signals respectively at the lattice points of the lattice dividing the multidimensional color space. In the following illustration and the accompanying drawings, the lookup table is written also as "LUT." The illustration in FIG. 2 is directed mainly to the functions related to the following illustration. The image processing control unit 17 may include configuration elements other than the configuration elements depicted in the drawing.

In another embodied example, instead of the image processing control unit 17, the CPU 11 may perform a part or all of the processes performed by the color signal input unit 40, the operation setting unit 41, the input signal processing units 42 and 43, and the interpolation processing unit 44. In another embodied example, a part or all of such processes may be performed by the CPU 31 of the computer apparatus 30. The LUT 45 may be stored in the memory 33 of the computer apparatus 30.

A computer program causing the CPU 31 to perform these data processes may be recorded in a machine-readable recording medium so that the computer program can be read by the medium reading unit 36 to be installed in the auxiliary storage device 32. The computer program causing the CPU 31 to perform these data processes may be downloaded from a network via a network interface to be installed in the auxiliary storage device 32.

The color signal input unit 40 takes a color signal of image data output to the image processing control unit 17 from the shading processing unit 15, as an input. The operation setting unit 41 selects one of the input signal processing units 42 and 43 to operate the selected the input signal processing unit 42 or 43.

On the basis of an input value of the color signal, the input signal processing units 42 and 43 both determine addresses for reading the lattice point data from the LUT 45, and determine interpolating coefficients that are used to interpolate the color signal using the lattice point data. Depending upon which of the input signal processing units 42 and 43 is operated, arrangement of the lattice points used in the interpolating process at the time of the color conversion varies.

The operation setting unit 41 may determine which of the input signal processing units 42 and 43 is made to operate, in accordance with setting made at the time of manufacturing the image reading apparatus 10. When only one of the input signal processing units 42 and 43 is used, only the lattice point data to be read by the used input signal processing unit may be stored in the memory 12.

For example, the operation setting unit 41 may determine which of the input signal processing units 42 and 43 is made to operate, in accordance with selection received from a user via the input unit 23 or the computer apparatus 30. For example, in accordance with image data input to the image processing control unit 17, the operation setting unit 41 may switch between the input signal processing units 42 and 43 to be operated. For example, the operation setting unit 41 determines which of the input signal processing units 42 and 43 is made to operate, in accordance with a histogram of the input image. When the input signal processing units 42 and 43 is switched to be operated, both lattice point data to be read by the input signal processing unit 42 and the input signal processing unit 43 may be stored in the memory 12.

The input signal processing units 42 and 43 output the addresses and the interpolating coefficients respectively to the arbitration unit 19 and the interpolation processing unit 44. In accordance with the addresses designated by the input signal processing units 42 and 43, the arbitration unit 19 reads the lattice point data from the LUT 45. The read lattice point data is input to the interpolation processing unit 44. The details of the input signal processing units 42 and 43 are illustrated later.

The interpolation processing unit 44 uses the lattice point data of the lattice points around the input value of the color signal to calculate the converted color signal by linear interpolation. The interpolation processing unit 44 determines a distance between the input value and each lattice point around the input value on the basis of the interpolating coefficients output from the input signal processing units 42 and 43, and performs interpolating arithmetic operation in accordance with the determined distance to calculate the converted color signal.

2.2. Function of Input Signal Processing Unit 42

Figure 3:
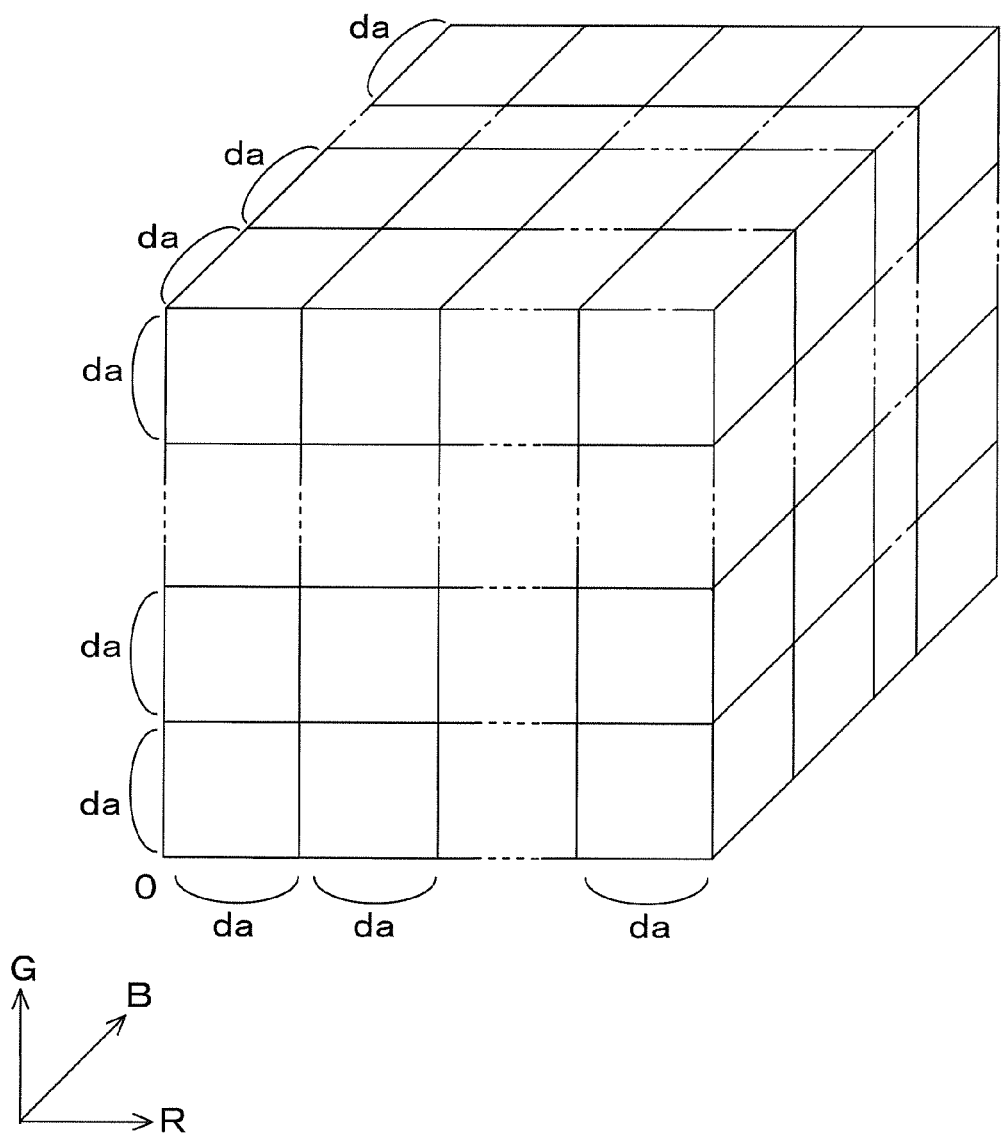
FIG. 3 depicts a first example of lattice points.

Next, the input signal processing unit 42 will be illustrated. FIG. 3 depicts a setting example of the lattice points used when the input signal processing unit 42 is operated. The color space having axes of color components, i.e., a red (R) component, a green (G) component, and a blue (B) component is divided into equal parts by a lattice-point interval da. FIG. 4 depicts one example of coordinates of the lattice points in FIG. 3. In this example, the lattice-point interval da is "16." In the following illustration, the axis directions of the R component, the G component, and the B component are written also as "R axis direction", "G axis direction", and "B axis direction", respectively. The color coordinates corresponding to the input value of the color signal are written also as "input point."

Figure 5:
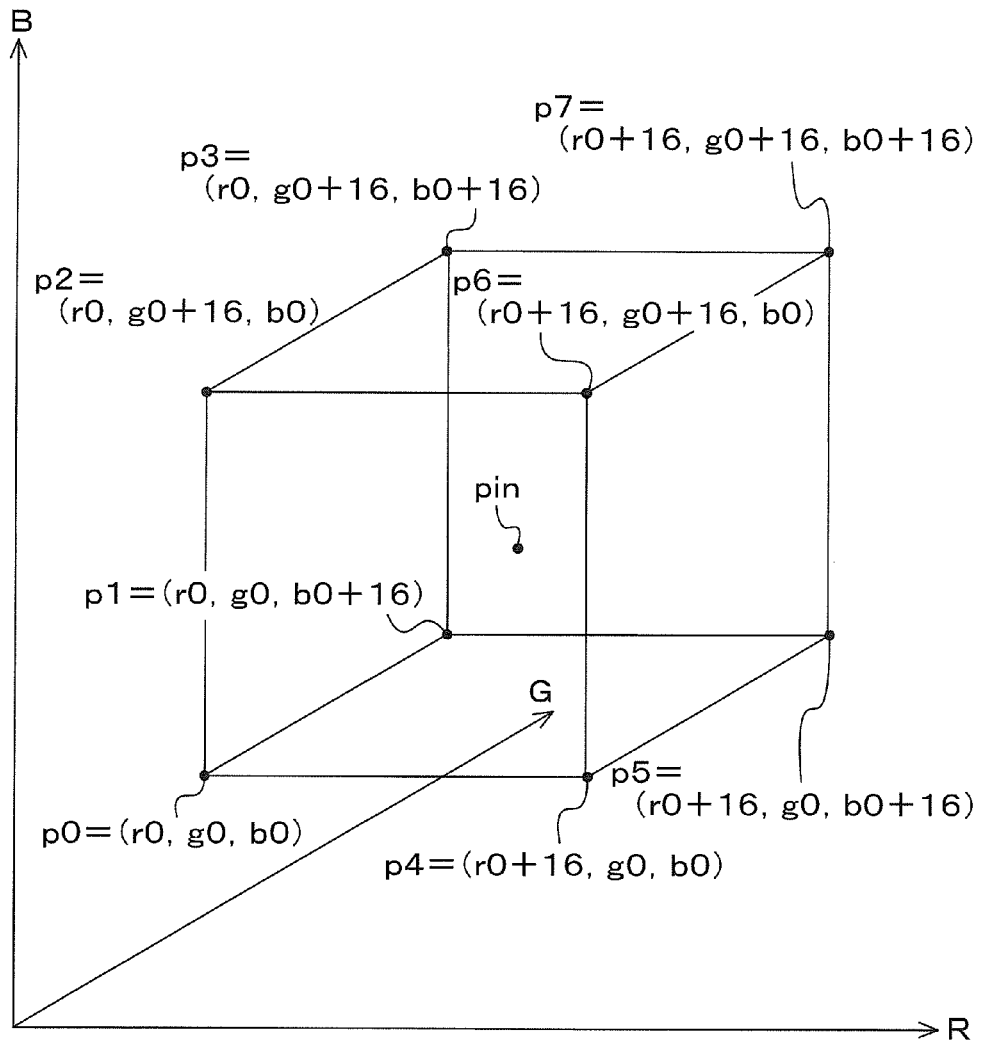
FIG. 5 depicts the lattice points of which lattice data is read.

On the basis of the input value, the input signal processing unit 42 determines the addresses for reading the lattice point data of the eight lattice points around the input point. FIG. 5 depicts the lattice points of which lattice point data is read, in the setting example of the lattice points in FIG. 4. The reference symbol pin designates the input point, and the reference symbols p0 to p7 designate the eight lattice points around the input point pin. When the coordinates of the lattice point p0 which is the closest to the origin among the lattice points p0 to p7 are represented by (r0, g0, b0), the coordinates of other lattice points p1 to p3 are (r0, g0, b0+16), (r0, g0+16, b0), and (r0, g0+16, b0+16), respectively. The coordinates of the lattice points p4 to p7 are (r0+16, g0, b0), (r0+16, g0, b0+16), (r0+16, g0+16, b0), and (r0+16, g0+16, b0+16), respectively.

In the following illustration, the reference symbol "p0" is used to indicate the lattice point closest to the origin among the eight lattice points around the input point pin. Moreover, in the following illustration, the reference symbols "p1" to "p7" are used to indicate the lattice points other than the lattice point p0, out of the eight lattice points around the input point pin.

Referring to FIG. 2, the input signal processing unit 42 includes an address generating unit 50 and a coefficient determining unit 51. The address generating unit 50 generates addresses for reading the lattice point data of the lattice points p0 to p7 on the basis of the input values of the color signal. The coefficient determining unit 51 determines, as the interpolating coefficients, the remainder obtained by dividing the input values by the lattice point interval "16."

When determining the addresses for reading the lattice point data, the address generating unit 50 generates intermediate addresses independently for respective color components of the input values of the color signal, and calculates the reading addresses for the lattice point data on the basis of the intermediate addresses. The address generating unit 50 includes an intermediate address calculating unit 52 that calculates the intermediate addresses, and an address calculating unit 53 that calculates the reading addresses from the intermediate addresses.

Figure 6:
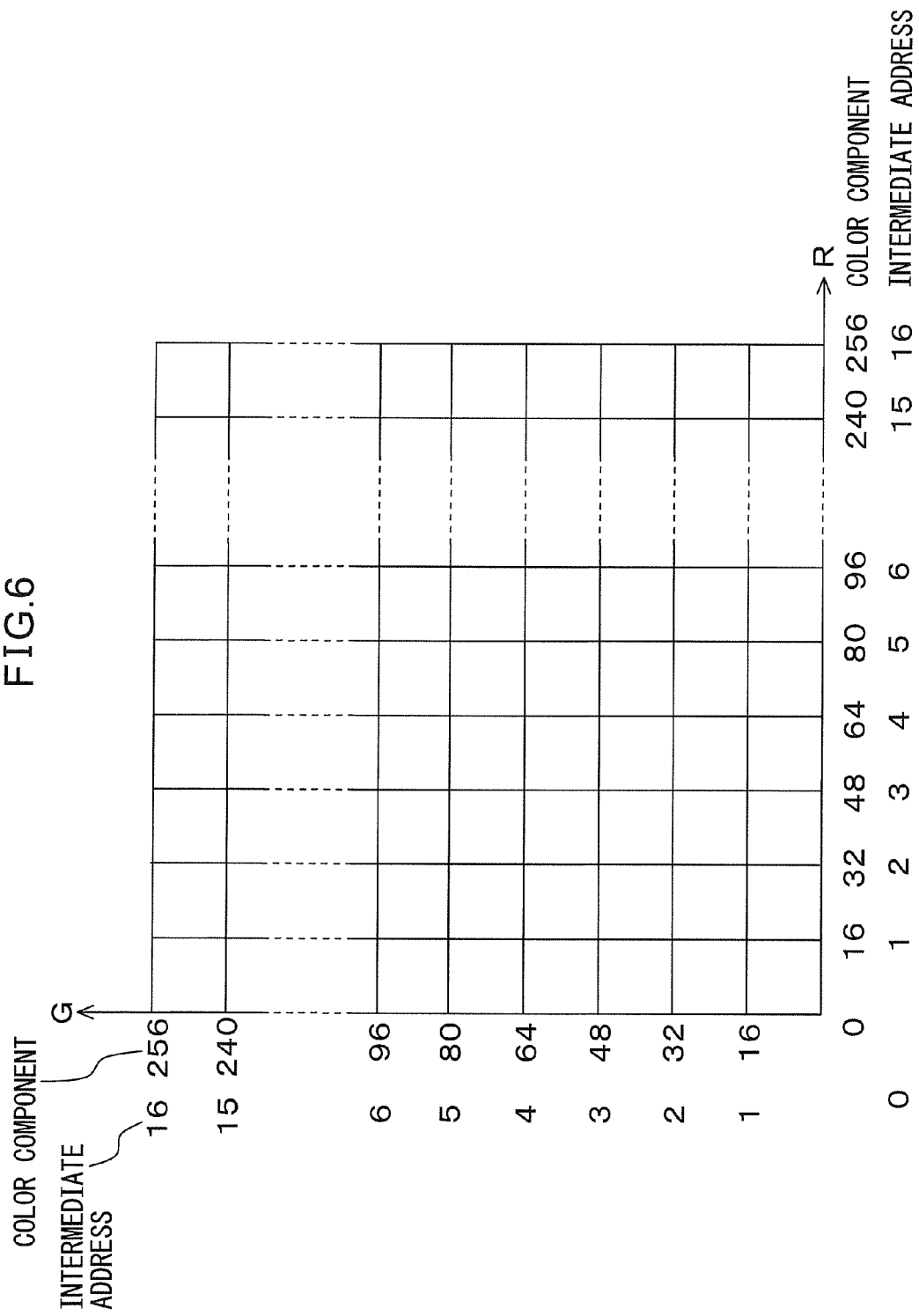
FIG. 6 depicts a first example of setting of intermediate addresses.

FIG. 6 depicts a first example of the intermediate addresses set for each lattice point. FIG. 6 depicts the intermediate addresses of the R component and the G component. The setting for the B components is made in the same manner. As the intermediate addresses of the R component, the seventeen integers "0" to "16" are allocated in ascending order from the smaller coordinate in the R axis direction. For example, the values "0", "1", "2", "3", . . . of the intermediates addresses for the R component are allocated to the lattice points of which R components are 0, 16, 32, 48, . . . respectively. The intermediate addresses for the G component and the B component are allocated in the same manner.

The intermediate address calculating unit 52 calculates, as the intermediate addresses for the R component, the G component, and the B component of the lattice point p0, the quotients obtained by dividing the R component rin, the G component gin, and the B component bin of the input point Pin by the lattice-point interval "16", respectively. The intermediate address calculating unit 52 increments the intermediate addresses of the color components of the lattice point p0 by one in accordance with relative position relation between the lattice point p0 and the other lattice points p1 to p7 to calculate the intermediate addresses of the other lattice points p1 to p7. For example, the intermediate addresses of the lattice point p1 are obtained by incrementing the intermediate address of the B component of the lattice point p0 by one. Further, for example, the intermediate addresses of the lattice point p6 are obtained by incrementing the intermediate addresses of the R component and the G component of the lattice point p0 by one respectively.

The address calculating unit 53 calculates, as the reading address, a multi-adic number in which values of the respective places of three digit represent the values of the intermediate addresses of the R component, the G component, and the B component. For example, the address calculating unit 53 calculates the three digit 17-adic number expressed by the following equation as the reading address when the intermediate addresses of the R component, the G component, and the B component are air, aig, and aib, respectively, and when the intermediate addresses have values ranging from 0 to 16.

reading address=$air+17 \times aig+17 \times 17 \times aib$

2.3. First Example of Image Converting Operation

Figure 7:
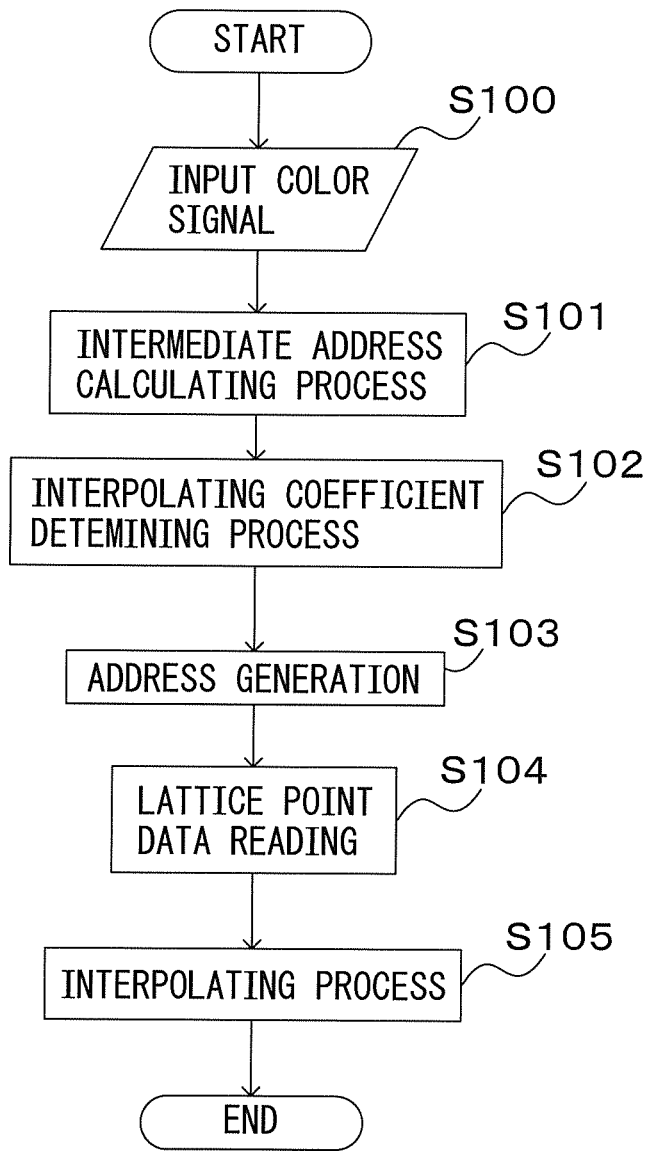
FIG. 7 depicts a first example of image converting operation.

Next, the image converting operation will be illustrated which is performed when the input signal processing unit 42 operates referring to FIG. 7. At the step S100, the color signal input unit 40 takes the color signal as an input. At the step S101, the intermediate address calculating unit 52 calculates the intermediate addresses. At the step S102, the coefficient determining unit 51 determines the interpolating coefficients.

At the step S103, the address calculating unit 53 calculates the reading addresses for the lattice point data of the lattice points p0 to p7 on the basis of the intermediate addresses. At the step S104, the arbitration unit 19 reads the lattice point data of the lattice points p0 to p7 from the LUT 45 in accordance with the addresses output from the address calculating unit 53. At the step S105, the interpolation processing unit 44 performs color conversion by the interpolating process based on the interpolating coefficients and the lattice point data of the lattice points p0 to p7. Then, the image converting operation is terminated.

2.4. Function of Input Signal Processing Unit 43

Figure 8:
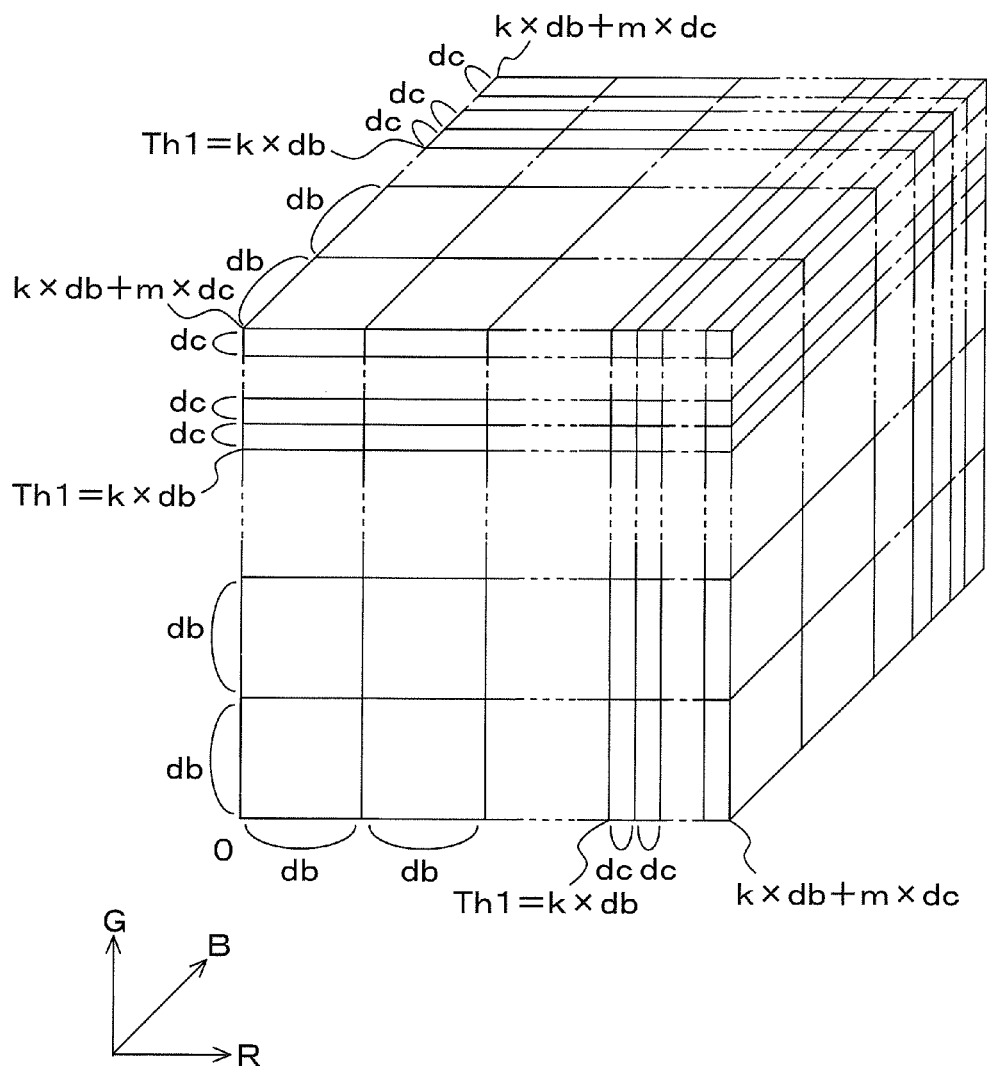
FIG. 8 depicts a second example of the lattice points.

Next, the input signal processing unit 43 will be illustrated. FIG. 8 depicts a first example of setting of the lattice points used when the input signal processing unit 43 operates. The lattice points in FIG. 8 are arranged at lattice-point intervals different between the region where a value of each color component is equal to or larger than a threshold Th1 and the region where a value of each color component is smaller than the threshold Th1. In the region where the value of the color component is smaller than the threshold Th1, the lattice-point interval in the axis direction of the color component is represented by db, and in the region where the value of the color component is equal to or larger than the threshold Th1, the lattice-point interval is represented by dc that is narrower than the interval db.

For example, in the region where the R component is smaller than the threshold Th1, the lattice-point interval in the R axis direction is db, and in the region where the R component is equal to or larger than the threshold Th1, the lattice-point interval in the R axis direction is dc. The lattice-point intervals in the other axis directions are set in the same manner. When the number of dividing the region in which the color component is smaller than the threshold Th1 in the each axis is assumed to be "k", the threshold value is Th1=k×db. When the number of dividing the region in which the color component is equal to or larger than the threshold Th1 in the each axis is assumed to be "m", the upper limit of each color component of the lattice points is k×db+m×dc.

In the illustration for the first embodied example, the region where all of the R component, the G component and the B component are equal to or larger than the threshold Th1 is written as "highlight region." The region where all of the R component, the G component and the B component are smaller than the threshold Th1 is written as "intermediate region." The region where any one or two of the R component, the G component and the B component are equal to or larger than the threshold Th1 is written as "extended region."

Figure 9A:
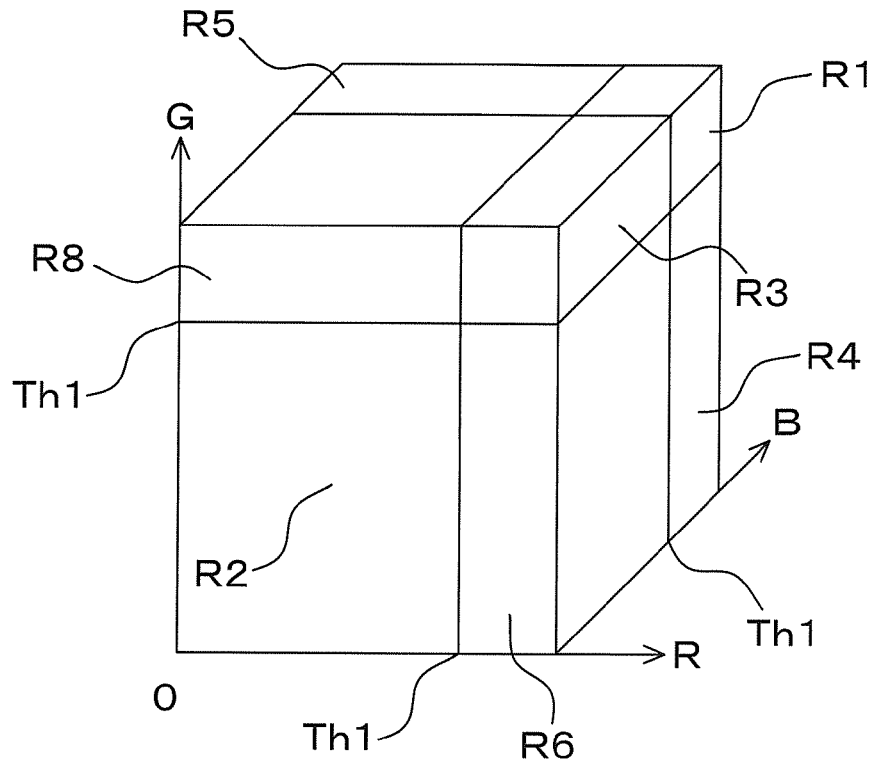
FIGS. 9A and 9B illustrate a highlight region, an intermediate region, and extended regions.
Figure 9B:
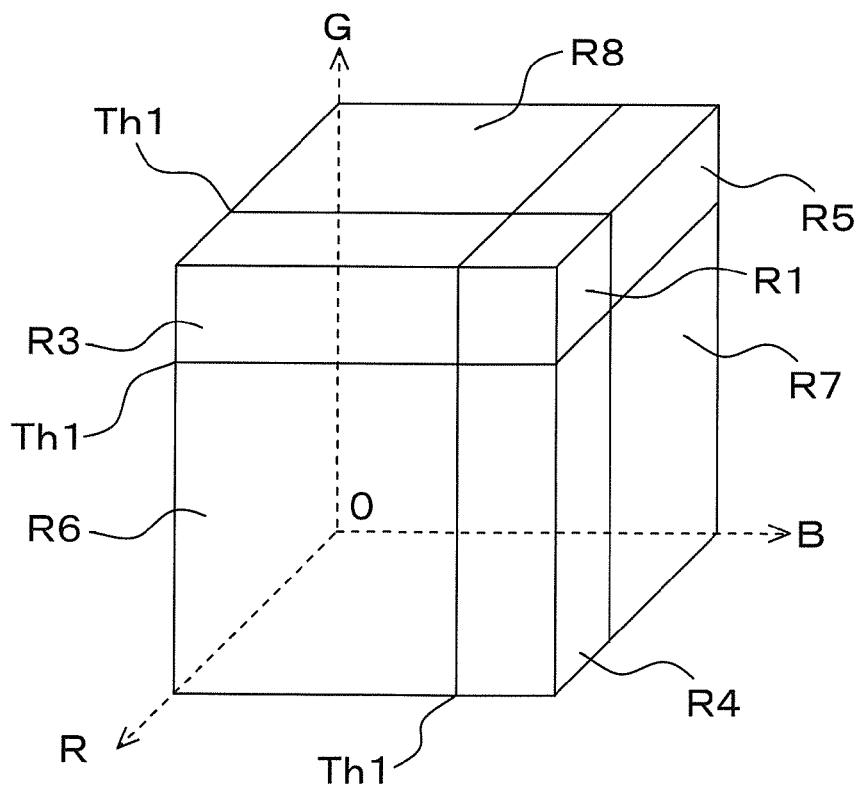

FIG. 9A and FIG. 9B are exemplary diagram depicting the highlight region, the intermediate region, and the extended regions. The region R1 is the highlight region where all of the R component, the G component and the B component are equal to or larger than the threshold Th1. The region R2 is the intermediate region where all of the R component, the G component and the B component are smaller than the threshold Th1.

The region R3 is the extended region where the R component and the G component are equal to or larger than the threshold Th1, and the B component is smaller than the threshold Th1. The region R4 is the extended region where the R component and the B component are equal to or larger than the threshold Th1, and the G component is smaller than the threshold Th1. The region R5 is the extended region where the G component and the B component are equal to or larger than the threshold Th1, and the R component is smaller than the threshold Th1. The region R6 is the extended region where the R component is equal to or larger than the threshold Th1, and the G component and the B component are smaller than the threshold Th1. The region R7 is the extended region where the B component is equal to or larger than the threshold Th1, and the R component and the G component are smaller than the threshold Th1. The region R8 is the extended region where the G component is equal to or larger than the threshold Th1, and the R component and the B component are smaller than the threshold Th1.

Figure 10:
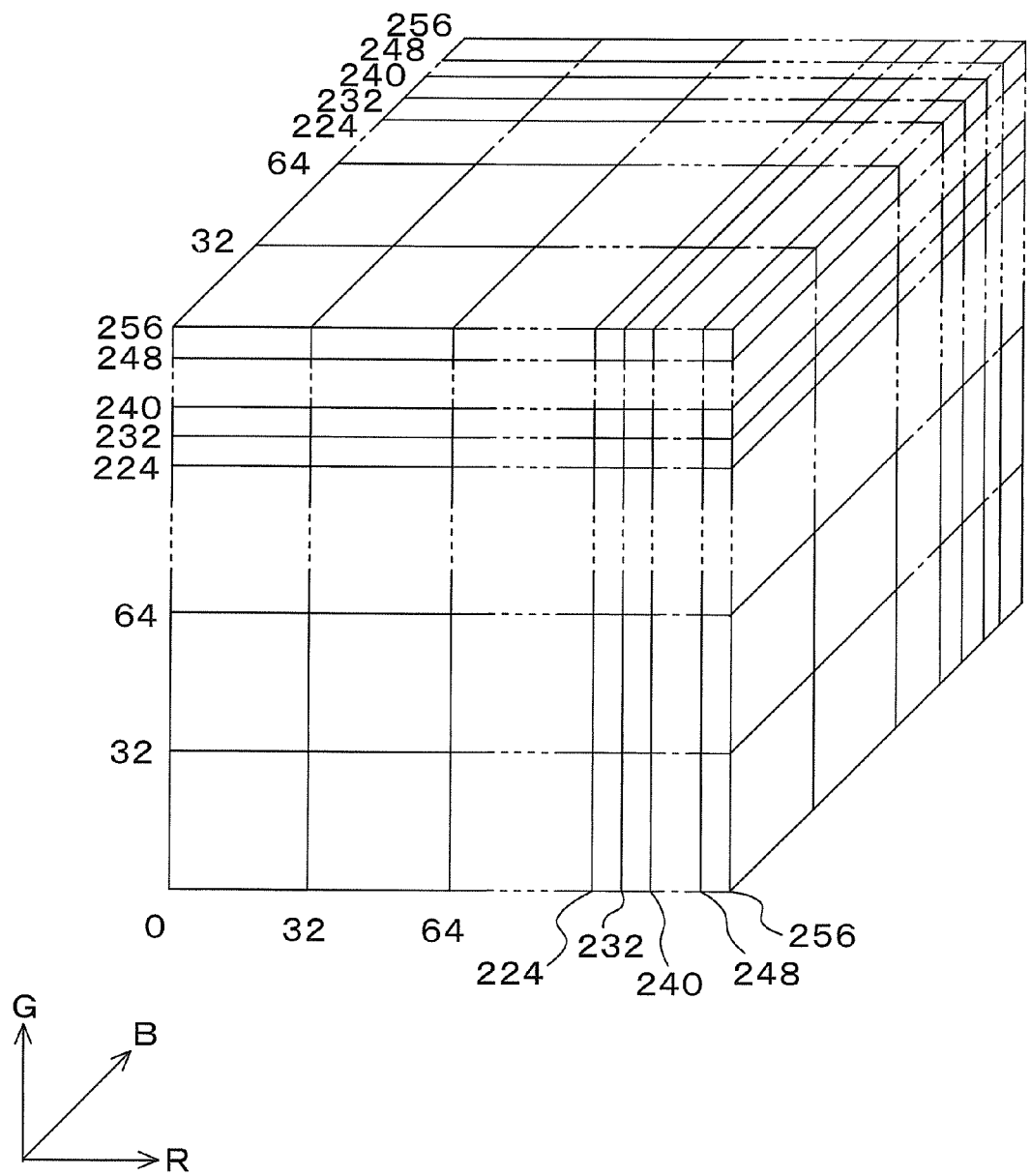
FIG. 10 depicts one example of coordinates of the lattice points in FIG. 8.

FIG. 10 depicts one example of coordinates of the lattice points in FIG. 8. The lattice-point interval db is "32" wider than the lattice-point interval "16" in FIG. 4. The lattice-point interval dc is "8" narrower than the lattice-point interval "16" in FIG. 4. The value of the threshold Th1 is "224", and the region ranging from "0" to "224" in each axis is divided into 7 equal parts by the lattice points with the lattice-point interval "32." The region ranging from "224" to "256" in each axis is divided into 4 equal parts by the lattice points with the lattice-point intervals "8."

Referring to FIG. 2, the input signal processing unit 43 includes a region determining unit 60, an address generating unit 61, and a coefficient determining unit 62. The region determining unit 60 determines which of the regions R1 to R8 is the region where the input point exists. By a calculating process that differs depending on which of the regions R1 to R8 is the region where the input point exists, the address generating unit 61 generates the reading addresses for reading the lattice point data of the lattice points p0 to p7 on the basis of the input values of the color signal.

By a calculating process depending on which of the regions R1 to R8 is the region where the input point exists, the coefficient determining unit 62 determines the interpolating coefficients on the basis of the input values of the color signal. The coefficient determining unit 62 divides the color components of the input values by the lattice-point intervals determined for the respective color components in the respective regions R1 to R8, to determine, as the interpolating coefficients, the remainders obtained by the dividing calculation. For example, when the input point exists in the intermediate region R2, the coefficient determining unit 62 calculates, as the interpolating coefficients, the remainders obtained by dividing the input values of the R component, the G component and the B component by the lattice-point intervals "32", "32" and "32" of the R component, the G component and the B component in the region R2, respectively. For example, when the input point exists in the extended region R4, the coefficient determining unit 62 calculates, as the interpolating coefficients, the remainders obtained by dividing the input values of the R component, the G component and the B component by the lattice-point intervals "8", "32" and "8" of the R component, the G component and the B component in the region R4, respectively.

When determining the addresses for reading the lattice point data, the address generating unit 61 calculates the intermediate addresses independently for respective color components of the input value of the color signal, and from the intermediate addresses, calculates the reading addresses for the lattice point data. The address generating unit 61 includes an intermediate address calculating unit 63 that calculates the intermediate addresses, and an address calculating unit 64 that calculates the reading addresses from the intermediate addresses.

Figure 11:
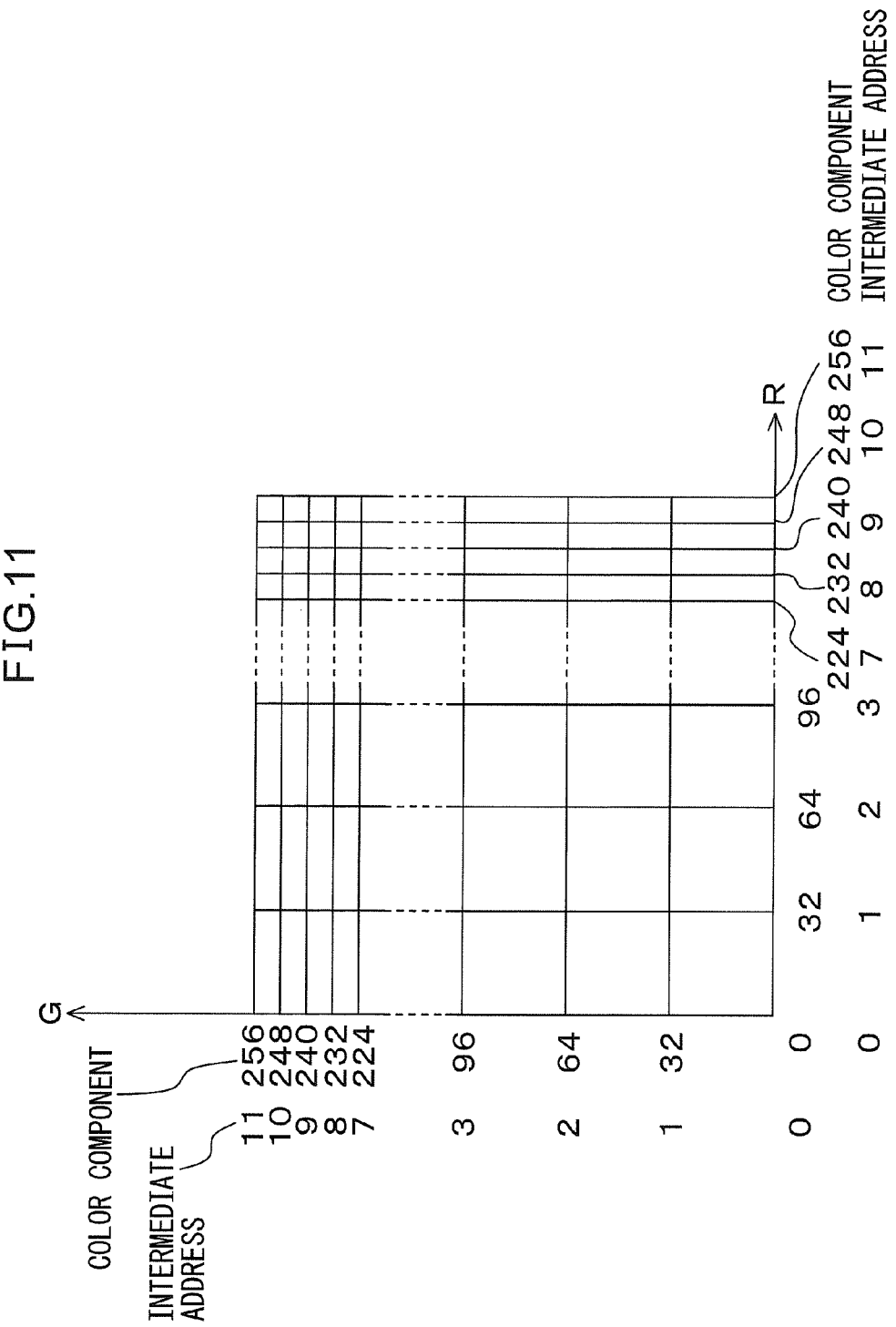
FIG. 11 depicts a second example of setting of the intermediate addresses.

FIG. 11 depicts a second example of the intermediate addresses set for each lattice point. FIG. 11 depicts the intermediate addresses set for the R component and the G component, and for the B component, the intermediate address is set in the same manner. As the intermediate addresses of the R component, 12 integers "0" to "11" are allocated to the coordinates in the ascending order from the smaller coordinates in the R axis direction. For example, the intermediate addresses "0", "1", "2", "3" to "6" of the R component are allocated to the R components "0", "32", "64", "96" to "192" in the intermediate region, respectively. The intermediate addresses "7", "8", "9", "10" and "11" of the R component are allocated to the R components "224", "232", "240", "248" and "256" equal to or larger than the threshold Th1. The intermediate addresses of the G component and the B component are allocated in the same manner.

The intermediate address calculating unit 63 calculates the intermediate addresses air, aig and aib of the R component, the G component, and the B component of the lattice point p0 by the following calculating processes (1) to (8) in accordance with which of the regions R1 to R8 is the region where the input point (rin, gin, bin) exists.

(1) For Input Point Existing in Highlight Region R1

The intermediate address calculating unit 63 calculates the quotient obtained by dividing difference values by the lattice-point interval "8" in the region R1 respectively, the difference values being obtained by subtracting the thresholds "224" from the R component, the G component, and the B component of the input point. The intermediate address calculating unit 63 calculates, as the intermediate addresses air, aig, and aib, the sum of the quotient and the integer "7" larger than the maximum value "6" of the intermediate addresses in the intermediate region. In other words, the intermediate addresses air, aig, and aib are as follows.

$air = (rin-224)/8+7$ $aig = (gin-224)/8+7$ $aib = (bin-224)/8+7$ (2) For Input Point Existing in Intermediate Region R2

The intermediate address calculating unit 63 calculates, as the intermediate addresses air, aig and aib, the quotients obtained by dividing the R component, the G components and the B component of the input point by the lattice-point intervals "32" in the respective axis directions in the region R2, respectively. In other words, the intermediate addresses air, aig, and aib are as follows.

$air = rin/32$ $aig = gin/32$ $aib = bin/32$ (3) For Input Point Existing in Extended Region R3

The intermediate addresses air and aig are calculated in the same manner as in the highlight region R1. The intermediate address aib is calculated in the same manner as in the intermediate region R2. In other words, the intermediate addresses air, aig, and aib are as follows.

$air = (rin-224)/8+7$ $aig = (gin-224)/8+7$ $aib = bin/32$ (4) For Input Point Existing in Extended Region R4

The intermediate addresses air and aib are calculated in the same manner as in the highlight region R1. The intermediate address aig is calculated in the same manner as in the intermediate region R2. In other words, the intermediate addresses air, aig, and aib are as follows.

$air = (rin-224)/8+7$ $aig = gin/32$ $aib = (bin-224)/8+7$ (5) For Input Point Existing in Extended Region R5

The intermediate addresses aig and aib are calculated in the same manner as in the highlight region R1. The intermediate address air is calculated in the same manner as in the intermediate region R2. In other words, the intermediate addresses air, aig, and aib are as follows.

$air = rin/32$ $aig = (gin-224)/8+7$ $aib = (bin-224)/8+7$ (6) For Input Point Existing in Extended Region R6

The intermediate address air is calculated in the same manner as in the highlight region R1. The intermediate addresses aig and aib are calculated in the same manner as in the intermediate region R2. In other words, the intermediate addresses air, aig, and aib are as follows.

$air = (rin-224)/8+7$ $aig = gin/32$ $aib = bin/32$ (7) For Input Point Existing in Extended Region R7

The intermediate address aib is calculated in the same manner as in the highlight region R1. The intermediate addresses air and aig are calculated in the same manner as in the intermediate region R2. In other words, the intermediate addresses air, aig, and aib are as follows.

$air = rin/32$ $aig = gin/32$ $aib = (bin-224)/8+7$ (8) For Input Point Existing in Extended Region R8

The intermediate address aig is calculated in the same manner as in the highlight region R1. The intermediate addresses air and aib are calculated in the same manner as in the intermediate region R2. In other words, the intermediate addresses air, aig, and aib are as follows.

$air = rin/32$ $aig = (gin-224)/8+7$ $aib = bin/32$

After that, the intermediate address calculating unit 63 calculates the intermediate addresses p1 to p7 for the other lattice points on the basis of the intermediate addresses of the lattice point p0. The address calculating unit 64 calculates, as the reading address, a multi-adic number in which the values of the respective places in the three digits represent the values of the R component, the G component, and the B component, respectively. Since the intermediate addresses air, aig, and aib calculated by the intermediate address calculating unit 63 have values from 0 to 11, the address calculating unit 64 may calculate, as the reading address, the 12-adic number of the three digits expressed by the following equation, in one example.

reading address=$a_{ir}$ of R component+12×$a_{ig}$+12×12× $a_{ib}$

2.5. Second Example of Image Converting Operation

Figure 12:
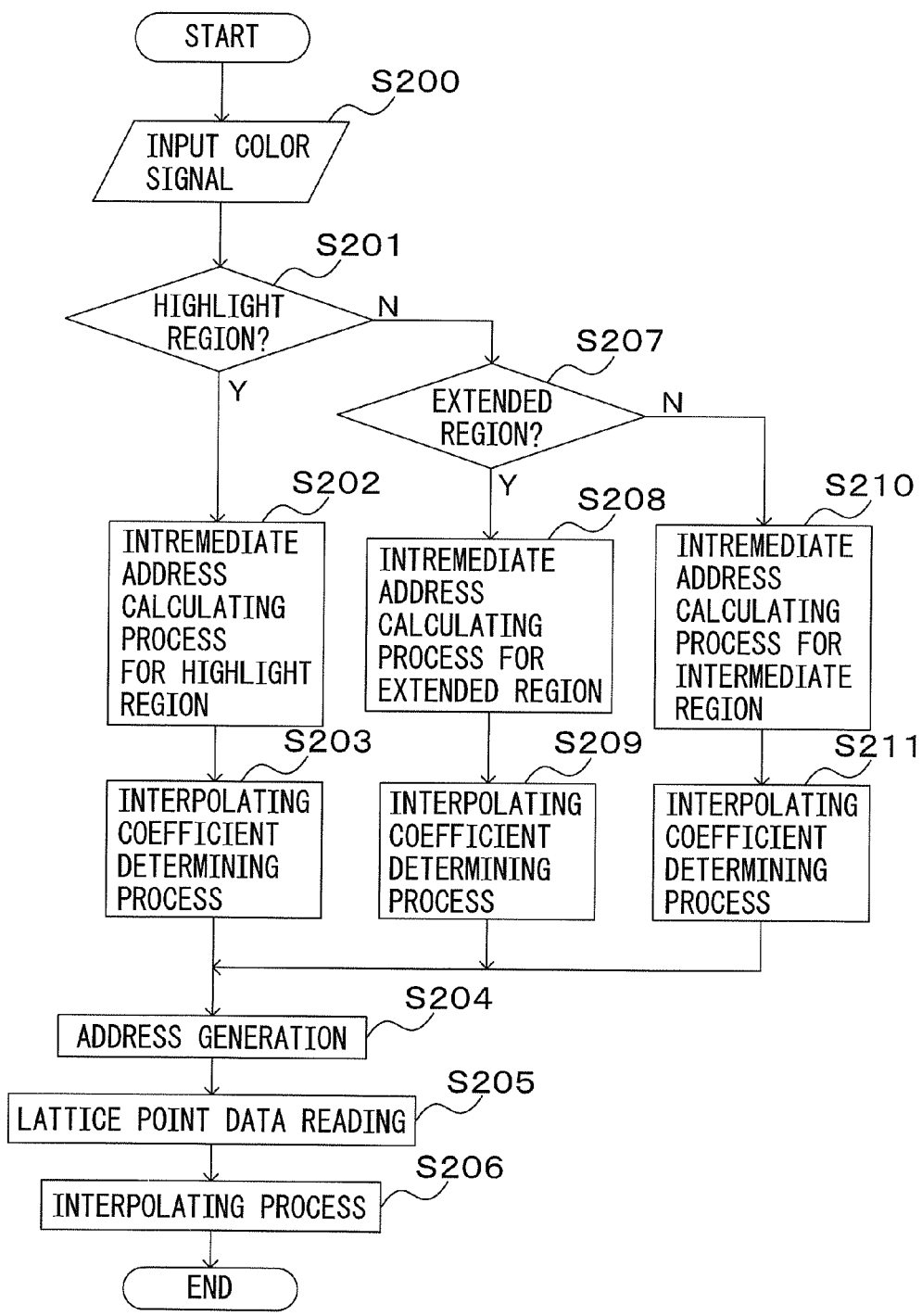
FIG. 12 depicts a second example of the image converting operation.

Next, referring to FIG. 12, the image converting operation will be illustrated which is performed when the input signal processing unit 43 operates. At the step S200, the color signal input unit 40 takes the color signal as an input. At the step S201, the region determining unit 60 determines whether or not the input point exists in the highlight region R1. When the input point exists in the highlight region R1 (YES at step S201), the process proceeds to the step S202. When the input point does not exist in the highlight region R1 (NO at step S201), the process proceeds to the step S207.

At the step S202, the intermediate address unit 63 calculates the intermediate addresses of the lattice point p0 by the above-described calculating process (1) of the intermediate addresses for the highlight region. Further, the intermediate address calculating unit 63 calculates the intermediate addresses for the other lattice points p1 to p7. At the step S203, the coefficient determining unit 62 determines the interpolating coefficients.

At the step S204, the address calculating unit 64 calculates the reading addresses for the lattice point data on the basis of the intermediate addresses. At the step S205, the arbitration unit 19 reads the lattice point data of the lattice points p0 to p7 from the LUT 45 in accordance with the addresses output by the address calculating unit 64. At the step S206, the interpolation processing unit 44 performs color conversion of the input color signal by the interpolating process based on the interpolating coefficients and the lattice point data of the lattice points p0 to p7. Then, the image converting operation is terminated.

At the step S207, the region determining unit 60 determines whether or not the input point exists in the extended regions R3 to R8. When the input point exists in one of the extended regions R3 to R8 (YES at step S207), the process proceeds to the step S208. When the input point does not exist in any of the extended regions R3 to R8 (NO at step S207), the process proceeds to the step S210.

At the step S208, the intermediate address calculating unit 63 calculates the intermediate addresses of the lattice point p0 by one of the above-described intermediate-address calculating processes (3) to (8) for the extended region in accordance with which of the extended regions R3 to R8 is the region where the input point exists. The intermediate address calculating unit 63 calculates the intermediate addresses of the other lattice points p1 to p7. At the step S209, the coefficient determining unit 62 determines the interpolating coefficients. Then, the process proceeds to the step S204.

At the step S210, the intermediate address calculating unit 63 calculates the intermediate addresses of the lattice point p0 by the above-described intermediate-address calculating process (2) for the intermediate region. At the step S211, the coefficient determining unit 62 determines the interpolating coefficients. Then, the process proceeds to the step S204.

2.6. Advantageous Effect by Embodied Example

According to the embodied example, the lattice-point interval is widened in the region where the value of the color signal is smaller than the threshold Th1. Thereby, a memory usage amount can be reduced. For example, an address usage amount of the LUT 45 storing the lattice point data of the lattice points in FIG. 4 is 17×17×17=4913. Meanwhile, an address usage amount for the lattice points in FIG. 10 of which interval is widened in the region where the value of the color signal is smaller than the threshold Th1 is 12×12× 12=1728.

Meanwhile, the lattice-point interval in the highlight region R1 is made to be "8" narrower than the lattice-point interval "32" in the intermediate region R2. For this reason, even if the lattice-point interval in the intermediate region R2 is widen to reduce a memory usage amount, interpolating accuracy in the highlight region R1 can be improved. For example, a set interval of thresholds for correcting the color signal in the highlight region R1 to be complete white can be made finer. Accordingly, it is possible to more easily perform correction such that a ground color can be corrected to be white while gradation of a pale color is maintained.

In addition, according to the present embodied example, in the extended regions R3 to R8, for the color component exceeding the threshold Th1, the lattice-point interval is made equal to the lattice-point interval in the highlight region R1. Thereby, the reading addresses for the lattice point data can be easily generated. The reason will be illustrated in detail referring to FIG. 13.

Figure 13:
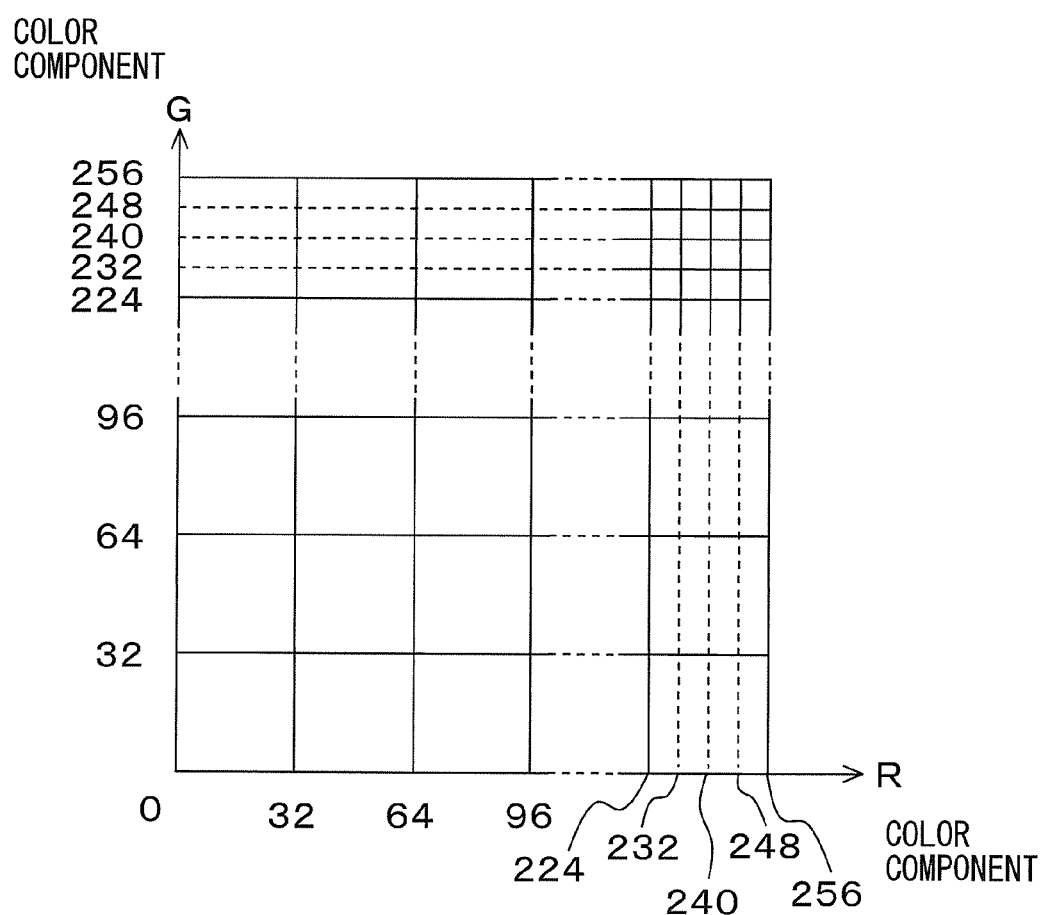
FIG. 13 depicts a third example of the lattice points.

FIG. 13 depicts an example of the lattice points in which the only lattice-point interval in the highlight region R1 is set to be narrower than the lattice-point intervals in the other regions. For example, the lattice-point interval in the highlight region R1 is "8", and the lattice-point intervals in the other regions are "32." When the lattice points are set in this manner, the number of the lattice points arranged in one line along the axis direction of each color component depends on the values of other color components.

For example, when the G component is "32", the lattice points along the R axis direction are positioned at the R coordinates "0", "32", . . . "224", and "256", and the number of them is 9. Meanwhile, when the G component is "232", the lattice points along the R axis direction are positioned at the R coordinates "0", "32", . . . "224", "232", "240", "248", and "256", and the number of them is 12.

For this reason, the number of the intermediate addresses calculated for the color components varies depending on values of other color components. As a result, a value of one color component affects calculation of the intermediate addresses of the other color components, so that calculation of the intermediate addresses is not independent for each color component. Meanwhile, according to the present embodied example, as depicted in FIG. 11, the number of the intermediate addresses calculated for each color component is constant regardless of values of the other color components. As a result, as in the above-described calculating processes (1) to (8), the intermediate addresses of each color component can be calculated regardless of values of the other color components. As a result, the reading addresses for the lattice point data can be easily generated to contribute to downsizing of a decode circuit that determines the addresses.

The extended regions R3 to R5 are close to primary colors of the CMY color system since values of two components among the R component, the G component, and the B component are relatively large. In the extended regions R3 to R5, change of these two components causes change of a hue, and change of the remaining one component causes change of chroma. Further, in the extended regions R3 to R5, the values of the two components are relatively large, so that a color tends to become a pale one of which entire brightness is high, and in the region of the pale color, hue difference tends to become noticeable. According to the present embodied example, the lattice-point intervals for the two components that cause change of a hue in the extended regions R3 to R5 are made narrower to enhance interpolating accuracy of the color components affecting change of a hue in the region of a pale color where change of hue is noticeable.

Thus, the lattice-point intervals of the extended regions R3 to R8 are set as in FIG. 8, so that it is possible not only to easily generate the reading addresses for the lattice point data, but also to improve interpolating accuracy of the color components affecting change of a hue in the extended regions R3 to R8 where change of a hue is noticeable.

2.7. Modified Example

The converted color signal stored as each lattice point data in the LUT 45 may be a color signal for the RGB color system, or a color signal for other color systems. In another embodied example, a color signal for a color system other than the RGB color system may be input. The color signals before and after conversion may be signals for the same color system or signals for different color systems.

The interpolation processing unit 44 may interpolate the lattice point data by an interpolating method other than the linear interpolating method to calculate the converted color signal. The interpolation processing unit 44 may use a polynominal interpolation of a high degree equal to or higher than the second degree, for example.

The lattice-point interval da of the lattice points in FIG. 3 may be a value other than "16." The lattice-point interval db in FIG. 8 may be a value other than "32", and may be wider or narrower than the lattice-point interval da in FIG. 3. The lattice-point interval do may be a value other than "8", and may be wider or narrower than the lattice-point interval da in FIG. 3. The lattice-point interval dc is only necessary to be narrower than the lattice-point interval db.

3. Second Embodied Example

Next, another embodied example of the image processing control unit 17 will be illustrated. In the region where all of the color components are close to a relatively low black, it is desirable to prevent a problem of what is called "misadjusted black level," and to maintain gradation in a dark part. In the present embodied example, the lattice-point intervals in the region where all of the color components are smaller than a threshold Th2 are made narrower than lattice-point intervals in the region where all of the color components are equal to or larger than the threshold Th2 and smaller than the threshold Th1. In the illustration of the second embodied example, the region where all of the color components are smaller than the threshold Th2 is written as "shadow region." The region where all of the color components are equal to or larger than the threshold Th2 and smaller than the threshold Th1 is written as "intermediate region." The highlight region and the extended region are the same as in the first embodied example.

Figure 14:
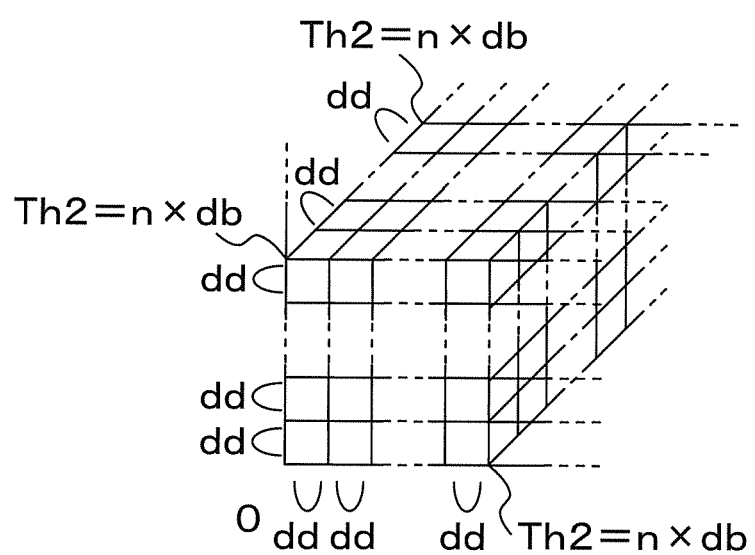
FIG. 14 depicts a fourth example of the lattice points.

FIG. 14 depicts a setting example of the lattice points in the shadow region out of the lattice points used when the input signal processing unit 43 operates. The lattice-point intervals dd in the shadow region are narrower than the lattice-point intervals db in the intermediate region. A value of the threshold Th2 is Th2=n×db, and the shadow region is divided into n equal parts by the lattice-point interval dd. The lattice-point intervals in the highlight region and the extended region may be the same as in the first embodied example.

For example, the lattice-point intervals db and dc are set to be "32" and "8" as in the first embodied example. The lattice-point interval dd is set to be "8." A value of the threshold Th2 is set to be Th2=db="32", and the region ranging from "0" to "32" in each axis is divided into 4 equal parts by the lattice with the lattice-point interval "8." The lattice-point interval dd may be a value other than "8", and may be wider or narrower than the lattice-point interval da in FIG. 3. The lattice-point interval dd is only necessary to be narrower than the lattice-point interval db.

Figure 15:
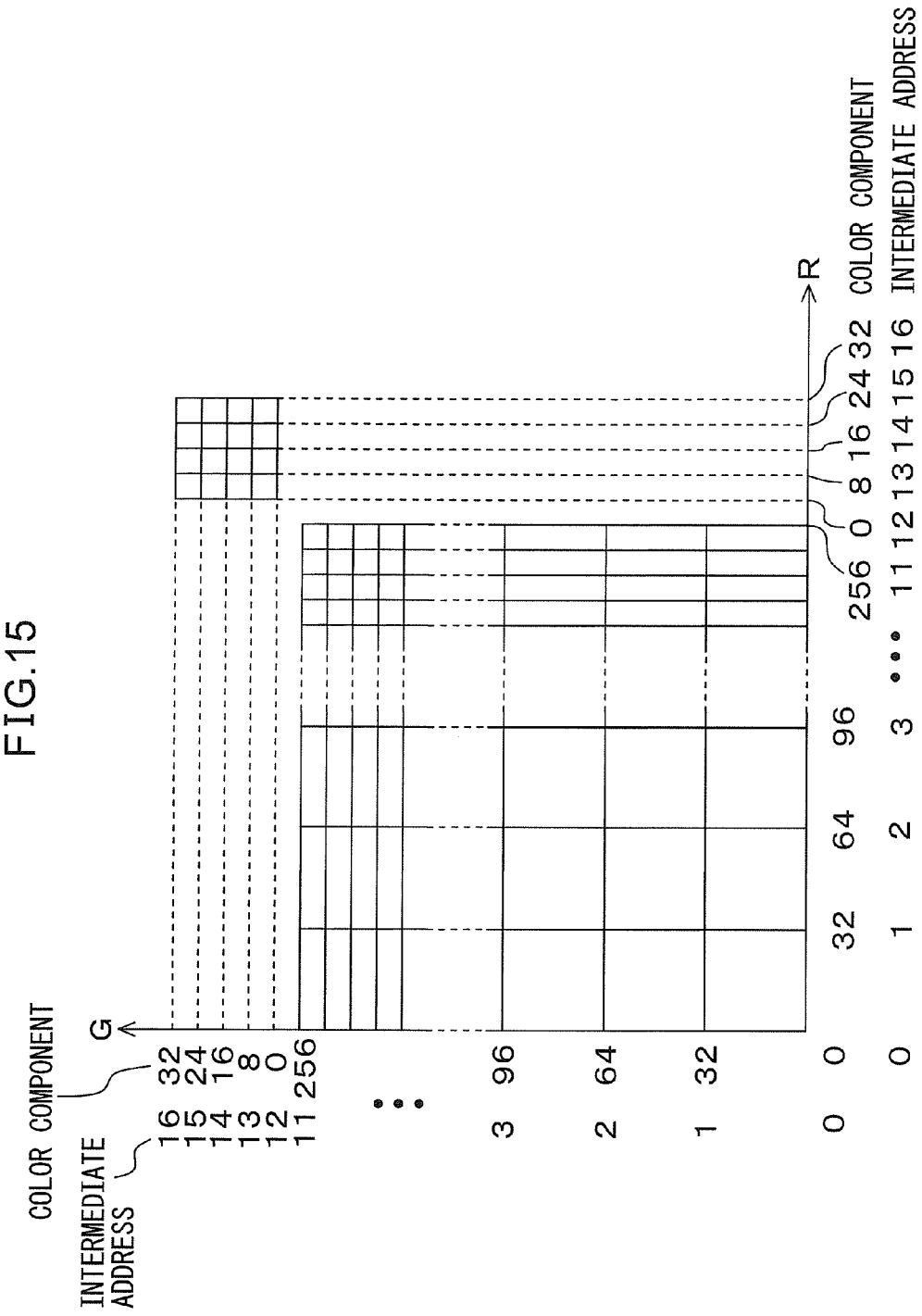
FIG. 15 depicts a third example of setting of the intermediate addresses.

FIG. 15 depicts a third example of setting of the intermediate addresses. FIG. 15 depicts the intermediate addresses of the R component and the G component, and the setting for the B component is made in the same manner. The allocation of the intermediate addresses in the intermediate region, the highlight region, and the extended regions is made in the same manner as in the first embodied example.

Values allocated to the intermediate addresses in the shadow region are larger than those allocated to the intermediate addresses in the other regions. In other words, as the intermediate addresses in the shadow region when the input point is in the shadow region, 5 integers "12" to "16" larger than the maximum value "11" of the intermediate addresses in the highlight region are allocated in the ascending order from the smaller coordinates. Accordingly, the intermediate addresses "12", "13", "14", "15", and "16" for the R component are allocated to the R components "0", "8", "16", "24", and "32" in the shadow region.

The intermediate address calculating unit 63 calculates the intermediate addresses air, aig, and aib of the R component, the G component, and the G component of the lattice point p0 when the input point (rin, gin, bin) exists in the shadow region, by the following calculating process (9).

(9) For Input Point in Shadow Region

The intermediate addresses air aig, and aib are calculated by adding the integer "12" and the respective quotients, the integer being larger than the maximum value "11" of the intermediate addresses in the highlight region, the quotients being obtained by dividing the R component, the G component, and the B component of the input point by the lattice-point interval "8" in the shadow region. In other words, the intermediate addresses air, aig, and aib are as follows.

$$air = 12 + rin/8$$

$$aig = 12 + gin/8$$

$$aib = 12 + bin/8$$

The calculating processes of the intermediate addresses in the highlight region, the intermediate region, and the extended regions are the same as the above-described processes (1) to (8).

Figure 16:
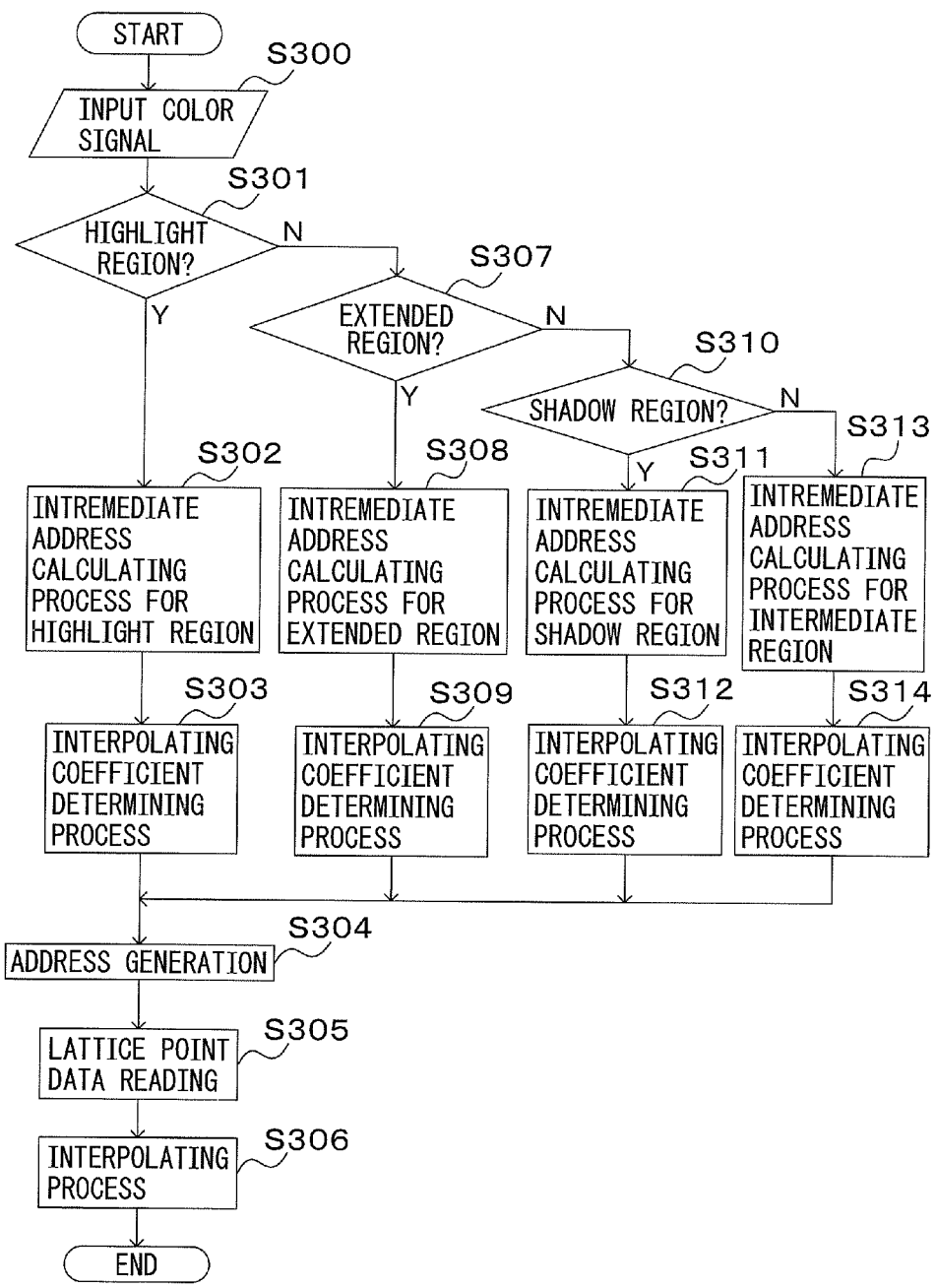
FIG. 16 depicts a third example of the image converting operation.

FIG. 16 depicts a third example of the image converting operation performed when the lattice-point interval in the shadow region is made narrower. The operation at the steps S301 to S309 is the same as the operation at the steps S201 to S209 illustrated above referring to FIG. 12. In the determination at the step S307, when the input point does not exist in the extended regions (NO at the step S307), the process proceeds to the step S310.

At the step S310, the region determining unit 60 determines whether or not the input point exists in the shadow region. When the input point exists in the shadow region (YES at the step 310), the process proceeds to the step S311. When the input point does not exist in the shadow region (NO at the step 310), the process proceeds to the step S313.

At the step S311, the intermediate address calculating unit 63 calculates the intermediate addresses of the lattice point p0 by the above-described calculating process (9) of the intermediate addresses for the shadow region. The intermediate address calculating unit 63 calculates the intermediate addresses of the other lattice points p1 to p7. At the step S312, the coefficient determining unit 62 determines the interpolating coefficients. Then, the process proceeds to the step S304.

The operation at the steps S313 and S314 is the same as the operation at the steps S210 and S211 illustrated above referring to FIG. 12.

According to the present embodied example, the lattice-point interval "8" in the shadow region is made narrower than the lattice-point interval "32" in the intermediate region. Accordingly, interpolating accuracy in the shadow region can be improved. For example, a set interval of thresholds for correcting a color signal in the shadow region to be complete black can be made finer. This facilitates a correction such that gradation of a dark part can be maintained while a misadjusted black level can be prevented.

In the present embodied example, values of the intermediate addresses given to the lattice points in the shadow region are larger than the maximum value of the intermediate addresses given to the lattice points in the other regions. Accordingly, allocation of the intermediate addresses in the regions other than the shadow region is not different from the allocation in the first embodied example. Accordingly, the intermediate address calculating unit 63 can calculate the intermediate addresses independently for respective color components. The lattice-point interval in the shadow region does not change depending on values of the color components. Accordingly, the intermediate address calculating unit 63 can calculate the intermediate addresses of each color component in the shadow region regardless of the other color components. As a result, the reading addresses for the lattice point data can be easily generated thereby contributing to downsizing of a decode circuit that determines the addresses.

Figure 17:
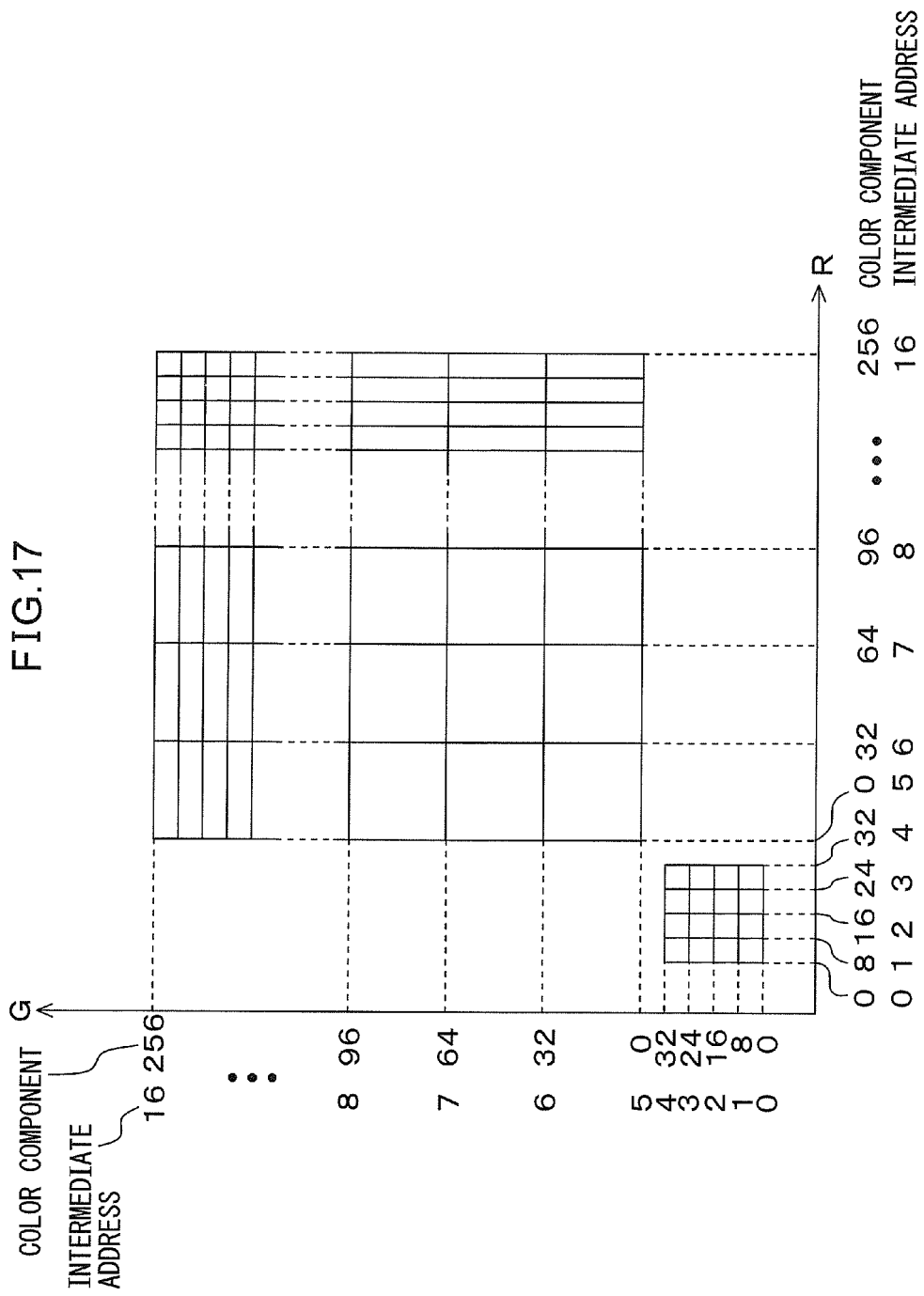
FIG. 17 depicts a fourth example of setting of the intermediate addresses.

In another embodied example, the intermediate addresses are given to the lattice points in the shadow region, the addresses being within a range of values smaller than the minimum value of the intermediate addresses given to the lattice points in the other regions. FIG. 17 depicts a fourth example of setting of the intermediate addresses. In this case, the intermediate address calculating unit 63 calculates, as the intermediate addresses air, aig, and aib, quotients obtained by dividing the R component, the G component, and the B component of the input point by the lattice-point interval "8."

To calculate the intermediate addresses in the highlight region, the intermediate region, and the extended regions, the intermediate address calculating unit 63 adds the value "5" to values calculated by the above-described calculating methods (1) to (8), the value "5" being larger than the maximum value "4" of the intermediate addresses in the shadow region. It is also possible to calculate such intermediate addresses independently for respective color components.

Figure 18:
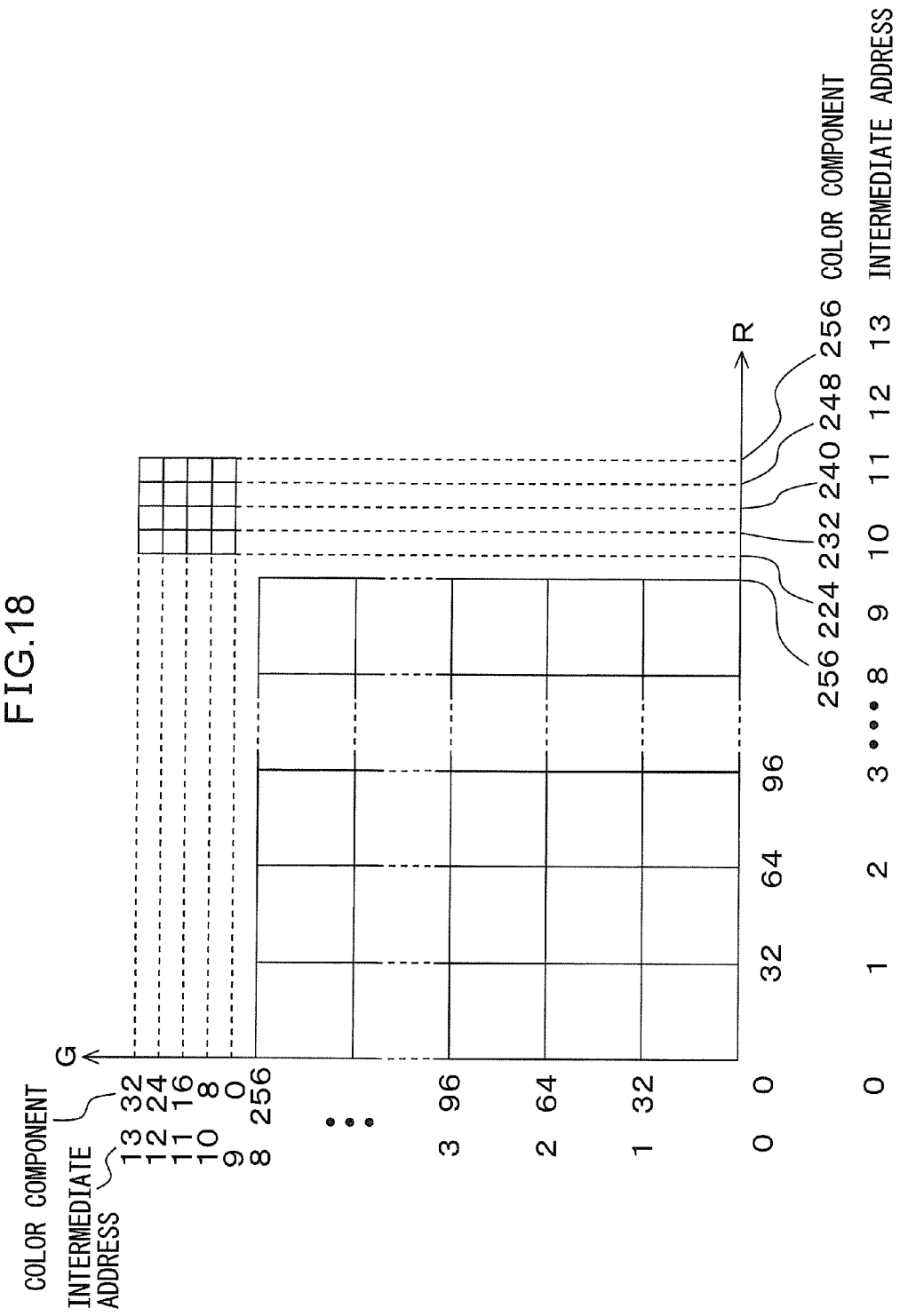
FIG. 18 depicts a fifth example of setting of the intermediate addresses.

In still another embodied example, the intermediate addresses given to the lattice points in the highlight region may be larger than the maximum value of the intermediate addresses given to the regions other than the highlight region. FIG. 18 depicts a fifth example of setting of the intermediate addresses. In the example of FIG. 18, it is assumed that the region where all of the color components exceed the threshold "224" is used as the highlight region. In the following illustration, the regions other than the highlight region are written as "non-highlight region." The lattice-point intervals of the highlight region and the non-highlight region are "8" and "32", respectively.

In the example of FIG. 18, when the input point exists in the non-highlight region, the intermediate addresses "0", "1", "2", "3", . . . "8" are allocated to the lattice points of the color components "0", "32", "64", "96", . . . "256." The maximum value of the intermediate addresses when the input point exists in the non-highlight region is "8."

When the input point exists in the highlight region, the 5 integers "9" to "13" larger than the maximum value "8" are allocated as the intermediate addresses of the lattice points of the color components "224" to "256." These intermediate addresses are calculated independently for respective color components, as well.

When the input point exists in the non-highlight region, the intermediate address calculating unit 63 calculates, as the intermediate addresses air, aig, and aib, the quotients by dividing the respective color components by the lattice-point interval "32" in the non-highlight region. In other words, the intermediate addresses air, aig, and aib are expressed as the following equation.

$air = rin/32$ $aig = gin/32$ $aib = bin/32$

When the input point exists in the highlight region, the intermediate address calculating unit 63 calculates the quotients by dividing difference values by the lattice-point interval "8" in the highlight region, the difference values being obtained by subtracting the threshold "224" from the respective color components. The intermediate address calculating unit 63 calculates, as the intermediate addresses air, aig, and aib, the sums of the quotients and the integer "9" respectively, the integer "9" being larger than the maximum value "8" of the intermediate addresses when the input point exists in the non-highlight region. In other words, the intermediate addresses air, aig, and aib are expressed as the following equation.

$air = (rin-224)/8 + 9$ $aig = (gin-224)/8 + 9$ $aib = (bin-224)/8 + 9$

Thus, when the intermediate addresses of which values are larger than the maximum value of the intermediate addresses given in the non-highlight region are given to the lattice points in the highlight region, the lattice-point interval in the extended regions does not need to be made narrower than the lattice-point intervals in the intermediate region, differently from the first embodied example. In another embodied example, the intermediate addresses of which values are smaller than the minimum value of the intermediate addresses given to the non-highlight region may be given to the lattice points in the highlight region.

According to the apparatus, the method, and the computer program illustrated herein, it is possible to improve interpolating accuracy in the highlight region while reducing a memory usage amount, in the color conversion using the lookup table and the interpolating process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus performing a color conversion of a multicolor image expressed by coordinates of a multidimensional color space, comprising:
a storage unit for storing lattice point data for each lattice point in the multidimensional color space;
an address generating unit for generating addresses for reading from the storage unit the lattice point data in a first region and a second region in the multidimensional color space in accordance with input values of a color signal, the first region being a region where values of all color components are equal to or larger than a first threshold, the second region being different from the first region; and
an interpolating unit for generating a converted color signal by an interpolating process based on the read lattice point data,
wherein a lattice-point interval in the first region is narrower than a lattice-point interval in the second region.

2. The image processing apparatus according to claim 1, wherein the address generating unit generates addresses for reading from the storage unit the lattice point data in a third region in the multidimensional color space, where a value of one of the color components is equal to or larger than the first threshold, and a value of another of the color components is smaller than the first threshold, and
in the third region, a lattice-point interval in an axis direction of the one of the color components is equal to a first interval that is the lattice point-interval in an axis direction of the color component in the first region, and a lattice-point interval in an axis direction of the another of the color components is equal to a second interval that is the lattice point-interval in an axis direction of the color component in the second region.

3. The image processing apparatus according to claim 2, wherein the address generating unit comprises:
an intermediate address calculating unit for calculating an intermediate address in accordance with an input value of each color component, for each of the color components; and
an address calculating unit for calculating, as the reading address for the lattice point data, a multi-adic number of which respective places are the intermediate addresses of the respective color components, and
the intermediate address calculating unit:
when the input value is equal to or larger than the first threshold, calculates as the intermediate address a sum of a quotient obtained by dividing a difference value by the first interval, the difference value being obtained by subtracting the first threshold from the input value, and a quotient obtained by dividing the first threshold by the second interval; and
when the input value is smaller than the first threshold, calculates as the intermediate address a quotient by dividing the input value by the second interval.

4. The image processing apparatus according to claim 1, wherein the address generating unit comprises:
an intermediate address calculating unit for calculating an intermediate address in accordance with an input value of each color component, for each of the color components, regardless of input values of the other color components; and
an address calculating unit for calculating, as the reading address for the lattice point data, a multi-adic number of which respective places are the intermediate addresses of the respective color components, and
the intermediate address calculating unit:
when the input value is equal to or larger than the first threshold, calculates the intermediate addresses that are larger than a maximum value of the intermediate addresses calculated for input values smaller than the first threshold, or calculates the intermediate addresses that are smaller than a minimum value of the intermediate addresses calculated for input values smaller than the first threshold.

5. The image processing apparatus according to claim 1, wherein the address generating unit generates an address for reading from the storage unit the lattice point data for a fourth region in the multidimensional color space, where values of all of the color components are smaller than a second threshold smaller than the first threshold, and
a lattice-point interval in the fourth region is narrower than the lattice-point interval in the second region.

6. The image processing apparatus according to claim 5, wherein the address generating unit comprises:
an intermediate address calculating unit for calculating the intermediate address in accordance with an input value of each color component, for each of the color components, regardless of input values of the other color components; and
an address calculating unit for calculating, as the reading address for the lattice point data, a multi-adic number of which respective places are the intermediate addresses of the respective color components, and
the intermediate address calculating unit:
when the input value is smaller than the second threshold, calculates the intermediate addresses that are larger than a maximum value of the intermediate addresses calculated for the input values equal to or larger than the second threshold, or calculates the intermediate addresses that are smaller than a minimum value of the intermediate addresses calculated for the input values equal to or larger than the second threshold.

7. The image processing apparatus according to claim 6, wherein the lattice point-interval in an axis direction of the color component in the fourth region is a third interval,
the intermediate address calculating unit:
when the input value is equal to or larger than the first threshold, calculates as the intermediate address a sum of a quotient obtained by dividing a difference value by the first interval, the difference value being obtained by subtracting the first threshold from the input value, and a quotient obtained by dividing the first threshold by the second interval,
when the input value is smaller than the first threshold, and equal to or larger than the second threshold, calculates as the intermediate address a quotient obtained by dividing the input value by the second interval, and
when the input value is smaller than the second threshold, calculates as the intermediate address a sum of a quotient obtained by dividing the input value by the third interval and a value larger than a maximum value of the intermediate addresses calculated for the input values equal to or larger than the first threshold.

8. The image processing apparatus according to claim 6, wherein the lattice point-interval in an axis direction of the color component in the fourth region is a third interval,
the intermediate address calculating unit:

when the input value is smaller than the second threshold, calculates as the intermediate address a quotient obtained by dividing the input value by the third interval, when the input value is equal to or larger than the first threshold, calculates as the intermediate address a sum of a quotient obtained by dividing a difference value by the first interval, the difference value being obtained by subtracting the first threshold from the input value, a quotient obtained by dividing the first threshold by the second interval, and a value larger than a maximum value of the intermediate addresses calculated for the input values smaller than the second threshold, and when the input value is smaller than the first threshold, and equal to or larger than the second threshold, calculates as the intermediate address a sum of a quotient obtained by dividing the input value by the second interval and the value larger than a maximum value of the intermediate addresses calculated for the input values smaller than the second threshold.

9. A color conversion method for a multicolor image expressed by coordinates a multidimensional color space, comprising:

generating addresses for reading lattice point data in a first region and a second region in the multidimensional color space in accordance with input values of a color signal, from a storage unit storing the lattice point data for each lattice point in the multidimensional color space, the first region being a region where values of all color components are equal to or larger than a first threshold, the second region being different from the first region; and generating a converted color signal by an interpolating process based on the read lattice point data, wherein a lattice-point interval in the first region is narrower than a lattice-point interval in the second region.

10. A computer-readable, non-transitory medium storing a computer program for image processing, wherein the computer program causes a processor to execute a process, the process comprising:

generating addresses for reading lattice point data in a first region and a second region in the multidimensional color space in accordance with input values of a color signal, from a storage unit storing the lattice point data for each lattice point in the multidimensional color space, the first region being a region where values of all color components are equal to or larger than a first threshold, the second region being different from the first region; and generating a converted color signal by an interpolating process based on the read lattice point data, wherein a lattice-point interval in the first region is narrower than a lattice-point interval in the second region.

* * * * *